United States Patent
Abdelghaffar et al.

(10) Patent No.: US 12,381,599 B2
(45) Date of Patent: Aug. 5, 2025

(54) INDICATION OF DOPPLER PRE-COMPENSATION IN MULTI-TRANSMISSION RECEPTION POINT COMMUNICATIONS

(71) Applicant: QUALCOMM INCORPORATED, San Diego, CA (US)

(72) Inventors: Muhammad Sayed Khairy Abdelghaffar, San Jose, CA (US); Alexandros Manolakos, Escondido, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 17/998,107

(22) PCT Filed: Jun. 30, 2020

(86) PCT No.: PCT/CN2020/099283
§ 371 (c)(1),
(2) Date: Nov. 7, 2022

(87) PCT Pub. No.: WO2022/000268
PCT Pub. Date: Jan. 6, 2022

(65) Prior Publication Data
US 2023/0179260 A1   Jun. 8, 2023

(51) Int. Cl.
*H04B 7/01* (2006.01)
*H04W 72/12* (2023.01)
*H04W 72/23* (2023.01)

(52) U.S. Cl.
CPC .............. *H04B 7/01* (2013.01); *H04W 72/12* (2013.01); *H04W 72/23* (2023.01)

(58) Field of Classification Search
CPC .... H04B 7/01; H04W 56/0035; H04W 72/12; H04W 72/23
See application file for complete search history.

(56) References Cited

U.S. PATENT DOCUMENTS 9,467,813 B2 * 10/2016 Hsu ....................... H04W 4/027
10,326,576 B2 * 6/2019 John Wilson ....... H04L 27/2613
(Continued)

FOREIGN PATENT DOCUMENTS

CA        3034026 A1 * 8/2019 ........ H04W 36/0061
CN      106664115 A     5/2017
(Continued)

OTHER PUBLICATIONS

CMCC: "Motivation for NR Enhancement for High Speed Train Scenario", 3GPP Draft, 3GPP TSG RAN Meeting #84, RP-191208, 3rd Generation Partnership Project (3GPP), Mobile Competence Centre, 650, Route Des Lucioles, F-06921, Sophia-Antipolis Cedex, France, vol. TSG RAN, No. Newport Beach, USA; Jun. 3, 2019-Jun. 6, 2019, Jun. 2, 2019 (Jun. 2, 2019), XP051747418, 4 pages, section 3, the Whole Document.
(Continued)

*Primary Examiner* — Eric Nowlin
(74) *Attorney, Agent, or Firm* — Holland & Hart LLP/Qualcomm Incorporated

(57) ABSTRACT

Methods, systems, and devices for wireless communications are described. A user equipment (UE) may receive a first reference signal from a first transmission reception point (TRP) and a second reference signal from a second TRP. The UE may estimate a first Doppler shift associated with the first TRP based on receiving the first reference signal and may estimate a second Doppler shift associated with the second TRP based on receiving the second reference signal. In some cases, the UE may receive a first Doppler pre-compensated downlink transmission from the first TRP and
(Continued)

a second Doppler pre-compensated downlink transmission from the second TRP based on a Doppler pre-compensation indication that indicates whether the downlink transmissions are Doppler pre-compensated.

69 Claims, 19 Drawing Sheets

(56) References Cited

U.S. PATENT DOCUMENTS

| | | | |
|---|---|---|---|
| 10,609,610 B2* | 3/2020 | Park | H04W 76/27 |
| 10,609,611 B2* | 3/2020 | Park | H04W 16/28 |
| 10,735,173 B2* | 8/2020 | Anaya Chamorro | H04W 72/543 |
| 10,841,854 B2* | 11/2020 | Wong | H04W 84/005 |
| 11,038,727 B2* | 6/2021 | Khoshnevisan | H04B 7/024 |
| 11,089,525 B2* | 8/2021 | Park | H04W 36/085 |
| 11,102,688 B2* | 8/2021 | Park | H04B 17/309 |
| 11,108,613 B2* | 8/2021 | Manolakos | H04L 27/261 |
| 11,129,070 B2* | 9/2021 | Park | H04W 76/19 |
| 11,223,985 B2* | 1/2022 | Park | H04W 36/085 |
| 11,265,097 B2* | 3/2022 | Park | H04W 80/02 |
| 11,336,407 B2* | 5/2022 | John Wilson | H04W 76/15 |
| 11,343,728 B2* | 5/2022 | Park | H04W 36/008355 |
| 11,503,587 B2* | 11/2022 | Khoshnevisan | H04L 5/0055 |
| 11,722,353 B2* | 8/2023 | Shahmohammadian | H04L 27/2675 370/329 |
| 11,930,466 B2* | 3/2024 | Venugopal | H04B 17/252 |
| 11,956,064 B2* | 4/2024 | Tian | H04L 1/0004 |
| 12,219,663 B2* | 2/2025 | Wong | H04W 36/324 |
| 2017/0201366 A1* | 7/2017 | Chamorro | H04W 28/0231 |
| 2018/0083730 A1 | 3/2018 | Gulati et al. | |
| 2018/0227035 A1* | 8/2018 | Cheng | H04B 7/0626 |
| 2018/0316472 A1* | 11/2018 | John Wilson | H04L 5/0048 |
| 2019/0132066 A1* | 5/2019 | Park | H04W 76/27 |
| 2019/0132777 A1* | 5/2019 | Park | H04W 16/28 |
| 2019/0132778 A1* | 5/2019 | Park | H04W 16/28 |
| 2019/0141592 A1* | 5/2019 | Park | H04W 76/18 |
| 2019/0166538 A1* | 5/2019 | Wong | H04W 36/324 |
| 2019/0261234 A1* | 8/2019 | Park | H04W 36/085 |
| 2019/0312700 A1* | 10/2019 | John Wilson | H04L 5/0035 |
| 2019/0387418 A1 | 12/2019 | Yerramalli et al. | |
| 2020/0052950 A1* | 2/2020 | Manolakos | H04L 5/0048 |
| 2020/0153666 A1* | 5/2020 | Khoshnevisan | H04L 5/0035 |
| 2020/0204312 A1* | 6/2020 | Xu | H04W 36/085 |
| 2020/0205141 A1* | 6/2020 | Khoshnevisan | H04L 5/0055 |
| 2020/0229057 A1* | 7/2020 | Park | H04W 36/0079 |
| 2020/0229058 A1* | 7/2020 | Park | H04W 16/28 |
| 2020/0287647 A1* | 9/2020 | Park | H04W 76/27 |
| 2021/0068029 A1* | 3/2021 | Wong | H04W 52/0206 |
| 2022/0069901 A1* | 3/2022 | Tian | H04B 7/18543 |
| 2022/0116256 A1* | 4/2022 | Shahmohammadian | H04L 27/2675 |
| 2022/0321289 A1* | 10/2022 | Sun | H04L 5/0053 |
| 2022/0376855 A1* | 11/2022 | Zhang | H04B 7/06968 |
| 2023/0017551 A1* | 1/2023 | Ren | H04W 36/0085 |
| 2023/0058765 A1* | 2/2023 | Zhu | H04L 5/0094 |
| 2023/0096382 A1* | 3/2023 | Levitsky | H04B 17/336 370/329 |
| 2023/0127731 A1* | 4/2023 | Yuan | H04W 72/23 370/329 |
| 2023/0133979 A1* | 5/2023 | Sun | H04L 5/0051 370/329 |
| 2023/0155760 A1* | 5/2023 | Sun | H04L 5/0035 370/329 |
| 2023/0156643 A1* | 5/2023 | Venugopal | H04W 72/02 370/329 |
| 2023/0216546 A1* | 7/2023 | Manolakos | H04L 5/0048 370/329 |
| 2023/0254741 A1* | 8/2023 | Laddu | H04W 36/0072 370/331 |
| 2023/0318688 A1* | 10/2023 | Huang | H04L 5/0051 370/329 |
| 2023/0412343 A1* | 12/2023 | Mei | H04L 5/0094 |
| 2023/0413197 A1* | 12/2023 | Zhu | H04L 5/0051 |
| 2024/0064674 A1* | 2/2024 | Marcone | H04L 27/2657 |
| 2025/0097885 A1* | 3/2025 | Bayesteh | H04W 64/00 |

FOREIGN PATENT DOCUMENTS

| | | | | |
|---|---|---|---|---|
| CN | 107911325 A | | 4/2018 | |
| CN | 115039350 A | * | 9/2022 | H04B 7/0413 |
| CN | 116114189 A | * | 5/2023 | H04B 7/18513 |
| CN | 119174125 A | * | 12/2024 | H04L 1/0001 |
| CN | 115039350 B | * | 1/2025 | H04B 7/0413 |
| EP | 3255804 A1 | | 12/2017 | |
| EP | 3528540 A1 | * | 8/2019 | H04W 36/0061 |
| EP | 3167671 B1 | * | 11/2019 | H04L 5/0098 |
| EP | 4013122 A1 | * | 6/2022 | H04B 17/309 |
| EP | 3616350 B1 | * | 10/2022 | H04L 27/2602 |
| EP | 4092925 A1 | * | 11/2022 | H04B 7/0413 |
| EP | 3494729 B1 | * | 9/2023 | H04W 36/324 |
| EP | 4277191 A2 | * | 11/2023 | H04L 27/261 |
| EP | 3528540 B1 | * | 4/2024 | H04W 36/0061 |
| EP | 4465695 A2 | * | 11/2024 | H04B 17/309 |
| JP | 2023513291 A | * | 9/2023 | |
| WO | WO-2016005765 A1 | * | 1/2016 | H04L 5/0098 |
| WO | WO-2018024867 A1 | * | 2/2018 | H04W 36/324 |
| WO | WO-2018132199 A1 | | 7/2018 | |
| WO | WO-2018200196 A1 | * | 11/2018 | H04L 27/2602 |
| WO | WO-2020033198 A1 | * | 2/2020 | H04L 27/261 |
| WO | WO-2020096798 A1 | * | 5/2020 | H04B 17/309 |
| WO | WO-2021159258 A1 | * | 8/2021 | H04B 7/0413 |
| WO | WO-2021253218 A1 | * | 12/2021 | |
| WO | WO-2021253664 A1 | * | 12/2021 | |
| WO | WO-2021254638 A1 | * | 12/2021 | H04W 36/0016 |
| WO | WO-2022050736 A1 | * | 3/2022 | H04B 7/18513 |
| WO | WO-2022073192 A1 | * | 4/2022 | H04L 5/0035 |

OTHER PUBLICATIONS

Huawei, et al., "Motivation for Further Performance Enhancement for LTE in High Speed Scenario", R4-1802702, 3GPP TSG-RAN WG4 Meeting #86, Athens, Greece, Feb. 26-Mar. 2, 2018, Mar. 2, 2018 (Mar. 2, 2018) the Whole Document, 7 Pages.

International Search Report and Written Opinion—PCT/CN2020/099283—ISA/EPO—Mar. 25, 2021.

Samsung: "Summary of Email Discussion for Rel.17 Enhancements on MIMO for NR", 3GPP TSG RAN Meeting #86, RP-192435, 3rd Generation Partnership Project, Mobile Competence Centre, 650, Route Des Lucioles, F-06921, Sophia-Antipolis Cedex, France, vol. TSG RAN, No. Sitges, Spain, Dec. 9, 2019-Dec. 12, 2019, Dec. 3, 2019, XP051835464, 31 Pages, p. 2, Paragraph 1-p. 5, Paragraph 3, Figures 3-4, p. 8, Paragraph 3-p. 9, Paragraph 2, p. 18, Paragraph 2, p. 32, Paragraph 2.

Supplementary European Search Report—EP20942785—Search Authority—Munich—Mar. 6, 2024.

* cited by examiner

INDICATION OF DOPPLER PRE-COMPENSATION IN MULTI-TRANSMISSION RECEPTION POINT COMMUNICATIONS

CROSS REFERENCE

The present application is a 371 national stage filing of International PCT Application No. PCT/CN2020/099283 by ABDELGHAFFAR et al. entitled "INDICATION OF DOPPLER PRE-COMPENSATION IN MULTI-TRANSMISSION RECEPTION POINT COMMUNICATIONS," filed Jun. 30, 2020, which is assigned to the assignee hereof, and which is expressly incorporated by reference in its entirety herein.

FIELD OF TECHNOLOGY

The following relates generally to wireless communications and more specifically to indication of doppler pre-compensation in multi-transmission reception point (TRP) communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support indication of doppler pre-compensation in multi-transmission reception point (TRP) communications. Various aspects of the described techniques provide for compensating for a Doppler shift associated with communications between multiple TRPs and a user equipment (UE). A UE may estimate one or more Doppler metrics (e.g., a Doppler shift, a maximum Doppler spread, or both) for multiple TRPs based on one or more reference signals from the TRPs (e.g., tracking reference signals (TRSs), synchronization signal block (SSB) transmissions, channel state information-reference signals (CSI-RSs)). The UE may transmit an indication to at least one of the TRPs indicating one or more of the estimated Doppler metrics. After the UE transmits the indications of the estimated Doppler metrics, one or more of the TRPs may transmit Doppler pre-compensated downlink transmissions to the UE. For example, a TRP may transmit a physical downlink shared channel (PDSCH) transmission to the UE that has been adjusted by the TRP to account for the Doppler shift (e.g., that is associated with that TRP) estimated by the UE. In some cases, the TRP may provide an indication to the UE that indicates whether the downlink communication is Doppler pre-compensated, and the UE may select a transmission configuration indicator (TCI) state and associated quasi-co-location (QCL) relation based on the indication of Doppler pre-compensation.

A method of wireless communication at a UE is described. The method may include estimating a first Doppler shift associated with a first transmission reception point and a second Doppler shift associated with a second transmission reception point, receiving a Doppler pre-compensation indication that indicates that one or more of a first communication from the first transmission reception point or a second communication from the second transmission reception point is Doppler pre-compensated based on the first Doppler shift or the second Doppler shift, selecting, based on the Doppler pre-compensation indication, a first transmission configuration indicator state for the first communication and a second transmission configuration indicator state for the second communication, and receiving the first communication based on the first transmission configuration indicator state and the second communication based on the second transmission configuration indicator state.

An apparatus for wireless communication at a UE is described. The apparatus may include a processor, memory coupled with the processor, and instructions stored in the memory. The instructions may be executable by the processor to cause the apparatus to estimate a first Doppler shift associated with a first transmission reception point and a second Doppler shift associated with a second transmission reception point, receive a Doppler pre-compensation indication that indicates that one or more of a first communication from the first transmission reception point or a second communication from the second transmission reception point is Doppler pre-compensated based on the first Doppler shift or the second Doppler shift, select, based on the Doppler pre-compensation indication, a first transmission configuration indicator state for the first communication and a second transmission configuration indicator state for the second communication, and receive the first communication based on the first transmission configuration indicator state and the second communication based on the second transmission configuration indicator state.

Another apparatus for wireless communication at a UE is described. The apparatus may include means for estimating a first Doppler shift associated with a first transmission reception point and a second Doppler shift associated with a second transmission reception point, receiving a Doppler pre-compensation indication that indicates that one or more of a first communication from the first transmission reception point or a second communication from the second transmission reception point is Doppler pre-compensated based on the first Doppler shift or the second Doppler shift, selecting, based on the Doppler pre-compensation indication, a first transmission configuration indicator state for the first communication and a second transmission configuration indicator state for the second communication, and receiving the first communication based on the first transmission configuration indicator state and the second communication based on the second transmission configuration indicator state.

A non-transitory computer-readable medium storing code for wireless communication at a UE is described. The code may include instructions executable by a processor to estimate a first Doppler shift associated with a first transmission reception point and a second Doppler shift associated with a second transmission reception point, receive a Doppler pre-compensation indication that indicates that one or more of a first communication from the first transmission reception point or a second communication from the second transmission reception point is Doppler pre-compensated based on the first Doppler shift or the second Doppler shift, select, based on the Doppler pre-compensation indication, a first transmission configuration indicator state for the first communication and a second transmission configuration indicator state for the second communication, and receive the first communication based on the first transmission configuration indicator state and the second communication based on the second transmission configuration indicator state.

In some examples of the method, apparatuses, and non-transitory computer-readable medium described herein, the receiving the Doppler pre-compensation indication may include operations, features, means, or instructions for receiving downlink control information from one or more of the first transmission reception point or the second transmission reception point that includes at least one bit that provides the Doppler pre-compensation indication. In some examples of the method, apparatuses, and non-transitory computer-readable medium described herein, the downlink control information includes a single bit that indicates both the first communication and the second communication are Doppler pre-compensated. In some examples of the method, apparatuses, and non-transitory computer-readable medium described herein, the downlink control information includes two or more bits that indicate that the first communication is Doppler pre-compensated, the second communication is Doppler pre-compensated, or that both the first communication and the second communication are Doppler pre-compensated.

In some examples of the method, apparatuses, and non-transitory computer-readable medium described herein, the receiving the Doppler pre-compensation indication may include operations, features, means, or instructions for receiving an indication of a change in transmission configuration indicator state from one or more of the first transmission reception point or the second transmission reception point. Some examples of the method, apparatuses, and non-transitory computer-readable medium described herein may further include operations, features, means, or instructions for determining whether the indication of the change in transmission configuration indicator state is associated with a quasi-co-location (QCL) type that has a low Doppler spread that indicates Doppler pre-compensation. In some examples of the method, apparatuses, and non-transitory computer-readable medium described herein, a subset of transmission configuration indicator states may be configured by radio resource control signaling to be associated with Doppler pre-compensation, and where the Doppler pre-compensation indication is determined based on whether the first transmission configuration indicator state or the second transmission configuration indicator state is within the subset of transmission configuration indicator states. In some examples of the method, apparatuses, and non-transitory computer-readable medium described herein, the Doppler pre-compensation indication may be provided separately for each of the first transmission reception point and the second transmission reception point based on one or more active transmission configuration indicator states.

In some examples of the method, apparatuses, and non-transitory computer-readable medium described herein, the receiving the Doppler pre-compensation indication may include operations, features, means, or instructions for receiving a medium access control (MAC) control element from one or more of the first transmission reception point or the second transmission reception point that includes at least one bit that provides the Doppler pre-compensation indication. In some examples of the method, apparatuses, and non-transitory computer-readable medium described herein, the MAC control element provides a separate Doppler pre-compensation indication for each of the first transmission reception point and the second transmission reception point, for each of one or more downlink channels, for each of one or more downlink reference signals, or any combinations thereof. In some examples of the method, apparatuses, and non-transitory computer-readable medium described herein, the MAC control element includes an activation indication for one or more of the first transmission configuration indicator state or the second transmission configuration indicator state, and an indication of Doppler pre-compensation for each transmission configuration indicator state.

In some examples of the method, apparatuses, and non-transitory computer-readable medium described herein, the receiving the Doppler pre-compensation indication may include operations, features, means, or instructions for receiving a control channel communication that is associated with a control resource set or a search space, where the control channel communication schedules the first communication and the second communication, and determining whether one or more of the first communication or the second communication is Doppler pre-compensated based on whether the control resource set or the search space is configured with a Doppler pre-compensation parameter. In some examples of the method, apparatuses, and non-transitory computer-readable medium described herein, the control resource set or the search space may be configured with the Doppler pre-compensation parameter via radio resource control signaling.

Some examples of the method, apparatuses, and non-transitory computer-readable medium described herein may further include operations, features, means, or instructions for receiving an indication that the first communication and the second communication are transmitted based on a single frequency network (SFN) configuration or based on a non-SFN configuration. In some examples of the method, apparatuses, and non-transitory computer-readable medium described herein, the SFN configuration uses Doppler pre-compensation and the non-SFN configuration does not use Doppler pre-compensation. In some examples of the method, apparatuses, and non-transitory computer-readable medium described herein, the receiving the Doppler pre-compensation indication may include operations, features, means, or instructions for receiving a medium access control (MAC) control element that includes one or more bits that indicate whether one or both of the SFN configuration or the non-SFN configuration use Doppler pre-compensation.

A method of wireless communication at a first transmission reception point is described. The method may include estimating a first Doppler shift associated with a first UE, determining that Doppler pre-compensation is to be used for a first communication to the UE from the first transmission reception point, transmitting a Doppler pre-compensation indication to the first UE that indicates that one or more of the first communication from the first transmission reception point or a second communication from a second transmission reception point is Doppler pre-compensated, and transmitting the first communication to the first UE, where the first communication is Doppler pre-compensated based on the first Doppler shift.

An apparatus for wireless communication at a first transmission reception point is described. The apparatus may include a processor, memory coupled with the processor, and instructions stored in the memory. The instructions may be executable by the processor to cause the apparatus to estimate a first Doppler shift associated with a first UE, determine that Doppler pre-compensation is to be used for a first communication to the UE from the first transmission reception point, transmit a Doppler pre-compensation indication to the first UE that indicates that one or more of the first communication from the first transmission reception point or a second communication from a second transmission reception point is Doppler pre-compensated, and transmit the first communication to the first UE, where the first communication is Doppler pre-compensated based on the first Doppler shift.

Another apparatus for wireless communication at a first transmission reception point is described. The apparatus may include means for estimating a first Doppler shift associated with a first UE, determining that Doppler pre-compensation is to be used for a first communication to the UE from the first transmission reception point, transmitting a Doppler pre-compensation indication to the first UE that indicates that one or more of the first communication from the first transmission reception point or a second communication from a second transmission reception point is Doppler pre-compensated, and transmitting the first communication to the first UE, where the first communication is Doppler pre-compensated based on the first Doppler shift.

A non-transitory computer-readable medium storing code for wireless communication at a first transmission reception point is described. The code may include instructions executable by a processor to estimate a first Doppler shift associated with a first UE, determine that Doppler pre-compensation is to be used for a first communication to the UE from the first transmission reception point, transmit a Doppler pre-compensation indication to the first UE that indicates that one or more of the first communication from the first transmission reception point or a second communication from a second transmission reception point is Doppler pre-compensated, and transmit the first communication to the first UE, where the first communication is Doppler pre-compensated based on the first Doppler shift.

In some examples of the method, apparatuses, and non-transitory computer-readable medium described herein, the transmitting the Doppler pre-compensation indication may include operations, features, means, or instructions for transmitting downlink control information to the first UE includes at least one bit that provides the Doppler pre-compensation indication. In some examples of the method, apparatuses, and non-transitory computer-readable medium described herein, the downlink control information includes a single bit that indicates both the first communication and the second communication are Doppler pre-compensated. In some examples of the method, apparatuses, and non-transitory computer-readable medium described herein, the downlink control information includes two or more bits that indicate that the first communication is Doppler pre-compensated, the second communication is Doppler pre-compensated, or that both the first communication and the second communication are Doppler pre-compensated.

In some examples of the method, apparatuses, and non-transitory computer-readable medium described herein, the transmitting the Doppler pre-compensation indication may include operations, features, means, or instructions for transmitting an indication of a change in transmission configuration indicator state from one or more of the first transmission reception point or the second transmission reception point. In some examples of the method, apparatuses, and non-transitory computer-readable medium described herein, the indication of the change in transmission configuration indicator state is associated with a quasi-co-location (QCL) type that has a low Doppler spread that indicates Doppler pre-compensation. In some examples of the method, apparatuses, and non-transitory computer-readable medium described herein, a subset of transmission configuration indicator states may be configured by radio resource control signaling to be associated with Doppler pre-compensation, and where the Doppler pre-compensation indication is based on whether the transmission configuration indicator state associated with one or more of the first transmission reception point or the second transmission reception point is within the subset of transmission configuration indicator states. In some examples of the method, apparatuses, and non-transitory computer-readable medium described herein, the Doppler pre-compensation indication may be provided separately for each of the first transmission reception point and the second transmission reception point based on one or more active transmission configuration indicator states.

In some examples of the method, apparatuses, and non-transitory computer-readable medium described herein, the transmitting the Doppler pre-compensation indication may include operations, features, means, or instructions for transmitting a medium access control (MAC) control element to the first UE that includes at least one bit that provides the Doppler pre-compensation indication. In some examples of the method, apparatuses, and non-transitory computer-readable medium described herein, the MAC control element provides a separate Doppler pre-compensation indication for each of the first transmission reception point and the second transmission reception point, for each of one or more downlink channels, for each of one or more downlink reference signals, or any combinations thereof. In some examples of the method, apparatuses, and non-transitory computer-readable medium described herein, the MAC control element includes an activation indication for a first transmission configuration indicator state associated with the first transmission reception point, and an indication of Doppler pre-compensation for the first transmission configuration indicator state.

In some examples of the method, apparatuses, and non-transitory computer-readable medium described herein, the transmitting the Doppler pre-compensation indication may include operations, features, means, or instructions for transmitting a control channel communication to the first UE that is associated with a control resource set or a search space, where the control channel communication schedules the first communication and the second communication, and where whether one or more of the first communication or the second communication are Doppler pre-compensated is determined based on whether the control resource set or the search space is configured with a Doppler pre-compensation parameter. In some examples of the method, apparatuses, and non-transitory computer-readable medium described herein, the control resource set or the search space may be configured with the Doppler pre-compensation parameter via radio resource control signaling.

Some examples of the method, apparatuses, and non-transitory computer-readable medium described herein may further include operations, features, means, or instructions for transmitting an indication that the first communication and the second communication may be transmitted based on a single frequency network (SFN) configuration or based on a non-SFN configuration. In some examples of the method, apparatuses, and non-transitory computer-readable medium described herein, the SFN configuration uses Doppler pre-compensation and the non-SFN configuration does not use Doppler pre-compensation. In some examples of the method, apparatuses, and non-transitory computer-readable medium described herein, the transmitting the Doppler pre-compensation indication may include operations, features, means, or instructions for transmitting a medium access control (MAC) control element that includes one or more bits that indicate whether one or both of the SFN configuration or the non-SFN configuration use Doppler pre-compensation.

DETAILED DESCRIPTION

Figure 1:
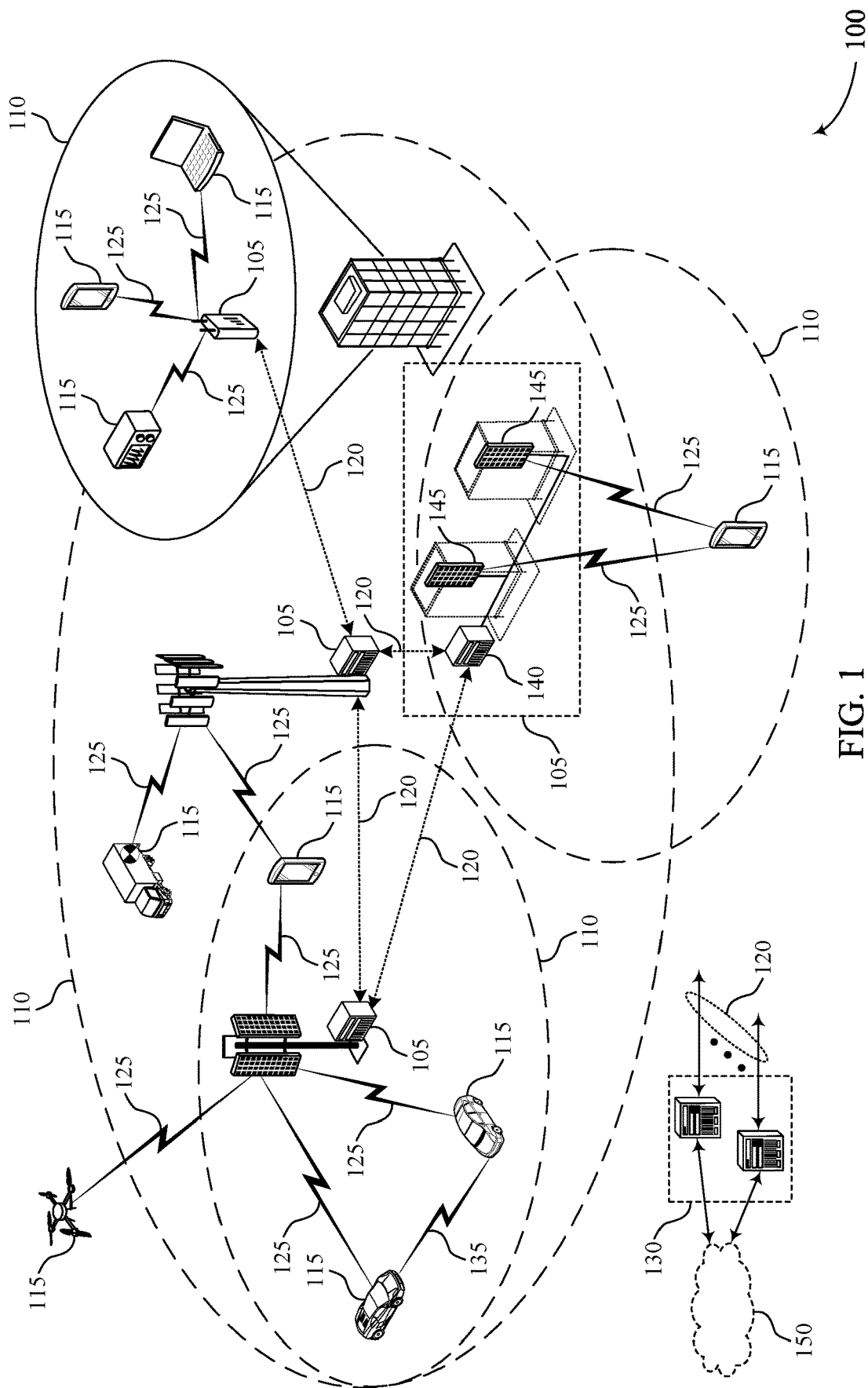
FIG. 1 illustrates an example of a system for wireless communications that supports indication of doppler pre-compensation in multi-TRP communications in accordance with aspects of the present disclosure.

In some wireless communications systems, a user equipment (UE) may support communications with multiple transmission reception points (TRPs) (e.g., in a multi-TRP configuration). For example, the wireless communications system may include a cell associated with multiple TRPs, in which a UE may communicate with the cell by more than one TRP. Additionally or alternatively, the wireless communications system may include a cell associated with multiple remote radio heads (RRHs), where the UE may communicate with a TRP by more than one RRH. For example, the UE may receive single frequency network (SFN) transmissions from the multiple TRPs (or multiple RRHs). That is, the UE may receive multiple instances of a transmission from each of the multiple TRPs and utilize them to decode a single downlink transmission. Additionally, the UE may be moving with respect to one or more of the TRPs. Thus, communications between the UE and each of the TRPs may by associated with Doppler shifts or Doppler spreads. In some cases, the Doppler effects on communications between a UE and the multiple TRPs may not be consistent from one TRP to another TRP. That is, communications between the UE and a first TRP may experience a larger Doppler shift than communications between the UE and a second TRP. In some cases, the variable Doppler effects on communications between the UE and the multiple TRPs may degrade communications (e.g. decrease a reliability of the communications) between the UE and the multiple TRPs.

In some cases, the UE may indicate, to one or more of the multiple TRPs, an estimated Doppler effect (e.g., an estimated Doppler shift, an estimated maximum Doppler spread) associated with each TRP. For example, a UE may receive a first reference signal (e.g., a tracking reference signal (TRS), a synchronization signal block (SSB) transmission, a channel state information-reference signal (CSI-RS)) from a first TRP and a second reference signal from a second TRP. Based on the received reference signals, the UE may estimate aspects of a channel (e.g., a Doppler shift, a Doppler spread) between each of the TRPs and UE. For example, the UE may estimate a first Doppler shift associated with the first TRP based on the first reference signal and may estimate a second Doppler shift associated with the second TRP based on the second reference signal. The UE may then transmit a first indication of the estimated Doppler effect (e.g., by an indication of an estimated Doppler shift or an estimated Doppler spread) to one or more of the multiple TRPs. For example, the UE may transmit a first indication of the first Doppler shift and a second indication of the second Doppler shift (e.g., to the first TRP, to the second TRP, or to the first and the second TRPs). In some examples, the UE may support communications with multiple RRHs located at different geographic locations of a single TRP. Here, the UE may receive the first reference signal from a first RRH of the first TRP and the second reference signal from a second RRH of the second TRP, where the first TRP and the second TRP are the same TRP.

Based on receiving an indication of the estimated Doppler effect, one or more of the TRPs may pre-compensate downlink transmissions (e.g., prior to transmitting the downlink transmissions to the UE) to account for the estimated Doppler effect associated with that TRP. Thus, the UE may receive downlink communications from the TRPs that have been Doppler pre-compensated. In some cases, this may decrease the Doppler effect on downlink communications received by the UE from multiple TRPs thereby enhancing downlink performance.

In some cases, one or more of the TRPs may provide an indication of whether downlink communications from the TRP (or TRPs) is Doppler pre-compensated. In some cases, such an indication may be provided by an explicit indication in downlink control information (DCI) that schedules the communication (e.g., a flag or bitmap that provides an indication of whether Doppler pre-compensation is used, which of the multiple TRPs are using Doppler pre-compensation, or any combinations thereof). In some cases, the indication of Doppler pre-compensation may be an implicit indication that is provided through a TCI state change (e.g., a TCI state change to a different TCI state index such that the new TCI state has a QCL type with 'Low Doppler spread', or to a TCI state with RRC parameter 'DL_Doppler_Pre-Compensation' set to enabled). In further cases, the indication of Doppler pre-compensation may be provided in a medium access control (MAC) control element (CE), in which the UE may receive a MAC-CE activation that indicates that downlink transmissions are Doppler pre-compensated. In still further cases, the indication of Doppler pre-compensation may be provided based on a control resource set (CORESET), a search space (SS) that schedules the downlink communication, or combinations thereof. Additionally or alternatively, one or more TRPs may provide a joint indication of Doppler pre-compensation for SFN and/or non-SFN communications with the UE (e.g., based on a rule regarding whether SFN/non-SFN are Doppler pre-compensated, or based on an indication in a MAC-CE that activates multi-TRP communications).

Various aspects of the subject matter described herein may be implemented to realize one or more of the following potential advantages. The techniques employed by the described UEs may provide benefits and enhancements to the operation of the UEs. For example, operations performed by the UEs may provide improvements to reliability and efficiency in receiving and decoding communications from multiple TRPs, in which Doppler pre-compensation may help reduce the likelihood of decoding errors due to uncompensated frequency offsets. Such techniques may be useful in various different situations, such as in cases where a UE is traveling at a relatively high speed in relation to one or more TRPs (e.g., in high speed train (HST) scenarios), and received signals may have a relatively large Doppler shifts. The described techniques may thus include features for improvements to reliability in communications and enhanced communications efficiency.

Aspects of the disclosure are initially described in the context of wireless communications systems. Various examples of multi-TRP communications and processes are then discussed. Aspects of the disclosure are further illustrated by and described with reference to apparatus diagrams, system diagrams, and flowcharts that relate to indication of doppler pre-compensation in multi-TRP communications.

FIG. 1 illustrates an example of a wireless communications system 100 that supports indication of doppler pre-compensation in multi-TRP communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS, which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Wireless communications systems 100 may support a multi-TRP configuration. For example, a UE 115 may receive downlink transmissions (e.g., via a physical downlink shared channel (PDSCH)) from multiple TRPs. Thus, the UE 115 may utilize one or more multiplexing schemes (e.g., spatial multiplexing) to receive and decode each of the downlink transmissions from the multiple TRPs. Additionally, the UE 115 may decode each of the downlink transmissions according to a transmission configuration indicator (TCI) state (e.g., a beam configuration) associated with the downlink transmission. In some cases, each TCI state may correspond to a quasi-colocation (QCL) relationship. For example, the UE 115-a may assume that certain channel estimations may be similar for transmissions associated with a same TCI state (e.g., due to the QCL relationship). In some cases of the multi-TRP configuration, a single TRP may transmit downlink control information (DCI) selecting multiple TCI states each associated with a downlink transmission from one of the multiple TRPs (e.g., when the multiple TRPs have an ideal backhaul communication link). For example, a first TRP may transmit DCI indicating a first TCI state for a subsequent downlink transmission by the first TRP. In this example, the second TRP may not transmit DCI to the UE 115. That is, although the UE 115 is in communication with multiple TRPs, the UE 115 may only receive DCI from the first TRP. Here, the UE 115 may receive downlink transmissions from multiple TRPs according to a single TCI state (e.g., indicated by the DCI). Thus, the UE 115 may not identify which TRP transmits different received downlink transmissions.

In some other cases of a multi-TRP configuration, the UE 115 may receive DCI from each of the multiple TRPs. In such cases, the UE 115 may decode downlink transmissions according to a TCI state indicated by the DCI transmitted by the same TRP. For example, the UE 115 may decode a downlink transmission from a first TRP according to a TCI state indicated by the first TRP within DCI. Additionally, the UE 115 may decode a downlink transmission from a second TRP according to a TCI state indicated by the second TRP within DCI. In some cases, a UE 115 may identify which TRP a TCI state is associated with based on a control resource set (e.g., a CORESET) associated with the DCI indicating the TCI state. That is, the UE 115 may receive the DCI from a TRP by a CORESET in a physical control channel (e.g., a PDCCH). The CORESET may be associated with a CORESET index (e.g., a CORESETPoolIndex) that indicates one or more TRPs. Thus, based on the CORESET associated with the received DCI, the UE 115 may identify a TRP or group of TRPs that transmitted the DCI. In turn, the UE 115 may identify a TRP or group of TRPs associated with the TCI state indicated by the DCI.

Additionally, a UE 115 in communication with more than one TRP may receive SFN transmissions from each of the TRPs. That is, more than one TRP may transmit a same downlink communication (e.g., a PDSCH transmission) to the UE 115 over a same set of frequency resources. Thus, the UE 115 may receive a same downlink transmission from more than one TRP. In some cases, this may increase a spatial diversity of the downlink transmission and may improve a reliability of the downlink transmission when compared to a downlink transmission that is transmitted by a single TRP. In some cases, an SFN transmission may be associated with a single TCI state. That is, the UE 115 may receive the downlink transmission based on a single TCI state and each TRP may transmit the downlink transmission according to the single TCI state. In some other cases, an SFN transmission may be associated with more than one TCI state. That is, the UE 115 may receive the downlink transmission based on more than one TCI state. Additionally, each TRP may transmit the downlink transmission based on the more than one TCI state.

To properly interpret received transmissions from one or more TRPs, the UE 115 may determine one or more properties of a channel over which the one or more transmissions were made. For example, the UE 115 may estimate aspects of a radio channel based on one or more reference signals transmitted over the channel between the TRP and the UE 115. The channel estimations may assist the UE 115 in interpreting received downlink transmissions and relevant channel state information (CSI), among other examples. In some cases, multiple TRPs may transmit reference signals to the UE 115 for channel estimation that are SFN reference signals. Thus, the UE 115 may perform channel estimations based on the SFN channel associated with multiple reference signal transmissions from different TRPs. In some cases, the UE 115 may be moving with respect to one or more of the TRPs, resulting in a Doppler effect impacting one or more of the reference signal transmissions. Additionally, a relative movement between the UE 115 and a first TRP may be different than a relative movement between the UE 115 and a second TRP. Thus, performing a single channel estimation on the SFN channel may not reliably estimate the Doppler effects on the channel.

In some other examples, the UE 115 may instead receive reference signals from the multiple TRPs that are not SFN reference signal transmissions. Thus, the UE 115 may perform a channel estimation (e.g., to estimate one or more Doppler metrics associated with the channel) on each channel associated with a single TRP. In some cases, this may enable the UE 115 to more reliably estimate the Doppler effects on the channels (e.g., when compared to estimating the Doppler effects on an SFN channel).

For example, the UE 115 may receive a reference signal from each TRP of the multiple TRPs. That is, a UE 115 may support communications with a first TRP and a second TRP. The UE 115 may receive a first reference signal from the first TRP and a second reference signal from the second TRP. In some cases, the first reference signal may be associated with a first Doppler shift and the second reference signal may be associated a second Doppler shift. For example, the first Doppler shift may cause the UE 115 to detect a first frequency shift of a transmission received from the first TRP, and the second Doppler shift may cause the UE 115 to detect a second frequency shift of a transmission received from the second TRP. The UE 115 may estimate the first Doppler shift based on the first reference signal received from the first TRP and may estimate the second Doppler shift based on the second reference signal received from the second TRP. In some cases, the first TRP and the second TRP may be the same TRP, and the UE 115 may receive the first reference signal from a first RRH of the first TRP and the second reference signal from a second RRH of the second TRP, where the first TRP and the second TRP are the same TRP. While various examples discussed herein refer to multiple TRPs, it is to be understood that techniques provided herein apply to cases with multiple RRHs, where multiple RRHs are associated with a same or different TRPs.

The UE 115 may then transmit a first indication of the first Doppler shift and a second indication of the second Doppler shift. In some cases, the UE 115 may transmit the first indication of the first Doppler shift and the second indication of the second Doppler shift to the first TRP, and the first TRP may forward the second indication of the second Doppler shift to the second TRP (e.g., via a backhaul link between the first TRP and the second TRP). In other cases, the UE 115 may transmit the first indication of the first Doppler shift to the first TRP and the second indication of the second Doppler shift to the second TRP. In some examples, the first TRP may Doppler pre-compensate a first downlink transmission based on the first Doppler shift, the second TRP may Doppler pre-compensate a second downlink transmission based on the second Doppler shift, or any combinations thereof. In some cases, the first downlink transmission and the second downlink transmission may provide a SFN transmission to the UE 115. Thus, the first TRP may transmit the first Doppler pre-compensated downlink transmission to the UE 115 via a PDSCH, and the second TRP may transmit the second Doppler pre-compensated downlink transmission to the UE 115 via the PDSCH. In some cases, one or more of the first TRP or second TRP may provide an indication of whether the first downlink transmission and/or the second downlink transmission are Doppler pre-compensated, and a TCI state associated with the respective TRP may be selected based on such an indication.

Figure 2:
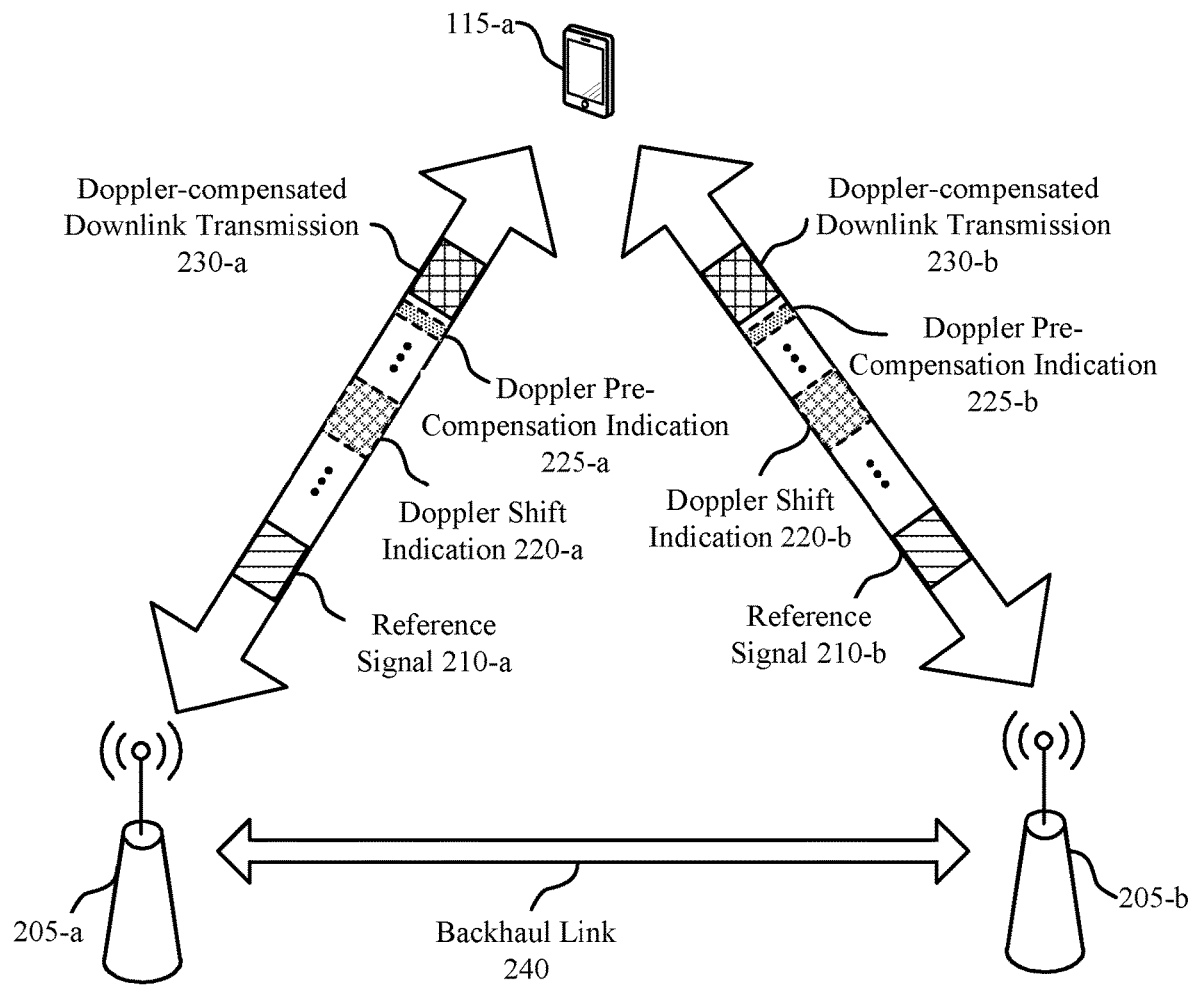
FIG. 2 illustrates an example of a portion of a wireless communications system that supports indication of doppler pre-compensation in multi-TRP communications in accordance with aspects of the present disclosure.

FIG. 2 illustrates an example of a wireless communications system 200 that supports indication of doppler pre-compensation in multi-TRP communications in accordance with aspects of the present disclosure. In some examples, wireless communications system 200 may implement aspects of wireless communications system 100. The wireless communications system 200 may include a UE 115-*a*, which may be an example of a UE 115 as described with reference to FIG. 1. Additionally, the wireless communications system 200 may include TRPs 205, which may be examples of access network transmission entities 145 as described with reference to FIG. 1. In wireless communications system 200, the UE 115-*a* may be configured to communicate with multiple TRPs 205 (e.g., TRP 205-*a* and TRP 205-*b*).

The UE 115-*a* may be in communication with a serving cell by the first TRP 205-*a* and the second TRP 205-*b*. In some cases, the UE 115-*a* may additionally be in communication with additional TRPs 205 associated with the serving cell. The UE 115-*a* may receive one or more indications (e.g., via RRC signaling, MAC-CE signaling, DCI transmissions, or combinations thereof) of active TCI states associated with receiving downlink transmissions from the TRP 205-*a* and the TRP 205-*b*. For example, the TRP 205-*a* may transmit DCI to the UE 115-*a* indicating a first TCI state for communications between the TRP 205-*a* and the UE 115-*a*. Additionally, the TRP 205-*b* may transmit DCI to the UE 115-*a* indicating a second TCI state (e.g., different from the first TCI state) for communications between the TRP 205-*b* and the UE 115-*a*. In another example, one of the TRPs 205 may transmit DCI to the UE 115-*a* that indicates the first TCI state for communications between the UE 115-*a* and the TRP 205-*a* and the second TCI state for communications between the UE 115-*a* and the TRP 205-*b*.

The UE 115-*a* may be capable of estimating Doppler metrics associated with the different channels between the UE 115-*a* and the TRPs 205 (e.g., the channel between the UE 115-*a* and the TRP 205-*a* and the channel between the UE 115-*a* and the TRP 205-*b*). In some cases, the UE 115-*a* may transmit an indication a capability of the UE 115-*a* to estimate a Doppler metrics. For example, the UE 115-*a* may transmit the indication of the UE capability to the first TRP 205-*a* and the second TRP 205-*b*. In other examples, the UE 115-*a* may transmit the indication of the UE capability to one of the first TRP 205-*a* or the second TRP 205-*b*. In this example, the TRP 205 that receives the indication of the UE capability to estimate the Doppler metrics may communicate the UE capability to the other TRP 205 (e.g., by the backhaul link 240). Based on determining that the UE 115-*a* is capable of estimating Doppler metrics for each of the channels between the UE 115-*a* and multiple TRPs 205, one of the TRPs 205 may transmit an indication (e.g., via RRC, DCI, MAC-CE, etc.) configuring the UE 115-*a* to perform the Doppler estimation.

The first TRP 205-a may transmit a first reference signal 210-a by the first TCI state and the second TRP 205-a may transmit the second reference signal 210-b by the second TCI state. The reference signals 210 may be, for example, a tracking reference signal (TRS) that may allow the UE 115-a to measure a frequency offset. Thus, the UE 115-a may receive the first reference signal 210-a according to a different TCI state than the second reference signal 210-b. This may enable the UE 115-a to perform a first channel estimation procedure using the first reference signal 210-a separately from performing a second channel estimation procedure using the second reference signal 210-b. When performing the channel estimation procedures, the UE 115-a may use the reference signals 210 to determine channel condition indicators (e.g., channel quality indicator (CQI), reference signal received power (RSRP), reference signal received quality (RSRQ), signal-to-interference-plus-noise ratio (SINR), rank indicator (RI)) for downlink transmissions associated with each TRP 205. That is, the UE 115-a may determine a signal strength associated with each of the received reference signals 210 (e.g., based on the RSRQ, the SINR).

Additionally, the UE 115-a may estimate one or more Doppler metrics (e.g., a Doppler shift, a Doppler spread) associated with each TRP 205 based on the received reference signals 210. For example, the UE 115-a may estimate a first Doppler shift or a first Doppler spread associated with the first TRP 205-a based on receiving the first reference signal 210-a. Additionally, the UE 115-a may estimate a second Doppler shift or a second Doppler spread associated with the second TRP 205-b based on receiving the second reference signal 210-b.

The UE 115-a may receive the reference signals 210 based on a TCI state corresponding to a TRP 205. In some cases, one or both of the TRPs 205 may transmit an indication (e.g., via DCI) of a first TCI state associated with the first reference signal 210-a and a second TCI state (e.g., unique from the first TCI state) associated with the second reference signal 210-b. In some cases, the UE 115-a may identify with which TRP 205 is associated with each reference signal 210 based on a TCI state associated with the reference signal 210 (e.g., based on a CORESET associated with the received DCI indicating the TCI states). That is, the CORESET associated with the DCI indication may be associated with a CORESET index (e.g., a CORESET-PoolIndex) that indicates one or more TRPs 205. For example, the first TRP 205-a may be associated with a first CORESET index and the TRP 205-b may associated with a second CORESET index. Here, the UE 115-a may identify that the first TCI state is associated with the first reference signal 210-a based on a CORESET of the indication of the first TCI state being associated with the first CORESET index. Additionally, the UE 115-a may identify that the second TCI state is associated with the second reference signal 210-b based on a CORESET of the indication of the second TCI state being associated with the second CORESET index.

The UE 115-a may decode the reference signals 210 based on a TCI state associated with the reference signal 210. For example, the UE 115-a may decode the first reference signal 210-a according to the first TCI state and may decode the second reference signal 210-b according to the second TCI state. The UE 115-a may then estimate the first Doppler shift based on the first reference signal 210-a and may estimate the second Doppler shift based on the second reference signal 210-b. In some cases, the UE 115-a may associate the first Doppler shift with the first CORESET index and the second Doppler shift with the second CORESET index.

The UE 115-a may indicate the estimated Doppler metrics (e.g., an estimated Doppler shift, an estimated Doppler spread, or both) associated with the first TRP 205-a and the second TRP 205-b to one or both of the TRPs 205.

In some cases, the UE 115-a may indicate the estimated Doppler metrics by a CSI report to one or both of the TRPs 205. For example, the UE 115-a may transmit a first Doppler shift indication 220-a of the first Doppler shift and a second Doppler shift indication 220-b of the second Doppler shift. In some cases, the UE 115-a may transmit the first Doppler shift indication 220-a to the first TRP 205-a and the second Doppler shift indication 220-b to the second TRP 205-b. In some other cases, the UE 115-a may transmit the first Doppler shift indication 220-a and the second Doppler shift indication 220-b the first TRP 205-a. Here, the first TRP 205-a may communicate the second indication of the second Doppler shift to the second TRP 205-b via a backhaul link 240 between the first TRP 205-a and the second TRP 205-b. In some instances, the UE 115-a may transmit the first Doppler shift indication 220-a and the second Doppler shift indication 220-b by a physical uplink control channel (PUCCH) or a physical uplink shared channel (PUSCH). The UE 115-a may transmit the Doppler shift indications 220 according to a configuration (e.g., indicated by one or both of the TRPs 205). For example, the UE 115-a may receive DCI from the first TRP 205-a or the second TRP 205-b that indicates a configuration for the Doppler shift indications 220. In some cases, the UE 115-a may transmit a CSI report including one or more additional fields corresponding to the first Doppler shift indication 220-a, the second Doppler shift indication 220-b, or both.

After transmitting the one or more Doppler shift indications 220, the UE 115-a may receive Doppler pre-compensated downlink transmissions 230, which may be SFN PDSCH transmissions. In some cases, the first TRP 205-a may Doppler pre-compensate a downlink transmission based on the first Doppler shift indication 220-a and the second TRP may Doppler pre-compensate a downlink transmission based on the second Doppler shift indication 220-b. That is, the first TRP 205-a may adjust a frequency of a of a downlink transmission prior to transmitting the downlink transmission to the UE 115-a to account for the effect of the estimated first Doppler shift associated with the first TRP 205-a. The first TRP 205-a may then transmit the first Doppler pre-compensated downlink transmission 230-a. Additionally, the second TRP 205-b may adjust a frequency of a downlink transmission prior to transmitting the downlink transmission to the UE 115-a to account for the effect of the estimated second Doppler shift associated with the second TRP 205-b. The second TRP 205-b may then transmit the second Doppler pre-compensated downlink transmission 230-b.

In some cases, the UE 115-a may receive a Doppler pre-compensation indication 225 from one or both of the TRPs 205. The Doppler pre-compensation indication may indicate whether downlink communications from the TRP(s) 205 are Doppler pre-compensated. In some cases, Doppler pre-compensation may be indicated separately for each TRP 205, in which the first TRP 205-a may transmit a first Doppler pre-compensation indication 225-a and the second TRP 205-b may transmit a second Doppler pre-compensation indication 225-b. In some cases, such an indication may be provided by an explicit indication in DCI that schedules the downlink communication (e.g., a flag or bit that provides an indication of whether Doppler pre-compensation is used, or a bitmap of which of the multiple TRPs 205 are using Doppler pre-compensation, or any combinations thereof). In some cases, the indication of Doppler pre-compensation may be an implicit indication that is provided through a TCI state change. For example, a TCI state change to a different TCI state index (e.g., indicated by a DCI or a MAC-CE) such that the new TCI state has a QCL type with 'Low Doppler spread', or to a TCI state that has an associated RRC parameter (e.g., RRC parameter 'DL_Doppler_PreCompensation') set to enabled.

In further cases, the indication of Doppler pre-compensation may be provided in a MAC-CE, in which the UE 115-a may receive a MAC-CE activation command for activating a TCI state that indicates that downlink transmissions are Doppler pre-compensated. Also, later in time, the UE 115-a may receive a MAC-CE deactivation command that indicates the downlink transmissions are not Doppler Pre-compensated. In some cases, the Doppler pre-compensation indication 225 may be provided per-TRP 205 using multiple bits to indicate whether each downlink channel (e.g., PDDCH, PDSCH, or combinations thereof) and downlink signal (e.g., TRS, SSB, or combinations thereof) are doppler pre-compensated. In some cases, the MAC-CE may combine a TCI activation MAC-CE command with a Doppler pre-compensation activation/deactivation command.

In still further cases, the indication of Doppler pre-compensation may be provided based on a CORESET and/or SS that schedules the downlink communication. In such cases, some SSs and/or CORESETs may be RRC configured with a Doppler pre-compensation parameter. In such cases, based on the CORESET and/or SS associated with a DCI that schedules the downlink communications, the UE 115-a may determine the status of Doppler pre-compensation for the downlink communication.

Additionally or alternatively, one or more TRPs 205 may provide a joint indication of Doppler pre-compensation for SFN and/or non-SFN communications with the UE 115-a (e.g., based on a rule regarding whether SFN/non-SFN are Doppler pre-compensated, or based on an indication in a MAC-CE that activates multi-TRP communications). In some cases, SFN and/or non-SFN communications may be Doppler pre-compensated, and the UE 115-a may determine whether Doppler pre-compensation is used or not. In some cases, an implicit indication may be used such as, for example, SFN PDSCH means Doppler pre-compensated while non-SFN PDSCH means no Doppler pre-compensation. In other cases, a reserved bit in a MAC-CE activation command may indicate both Doppler pre-compensation and SFN or non-SFN.

In this example, both TRPs 205 transmit Doppler pre-compensated downlink communications, and the UE 115-a may receive the first Doppler pre-compensated downlink transmission 230-a and the second Doppler pre-compensated downlink transmission 230-b. In some cases, the first Doppler pre-compensated downlink transmission 230-a and the second Doppler pre-compensated downlink transmission 230-b may be SFN PDSCH transmissions.

Such techniques may thus allow for enhanced reliability in decoding communications from the TRPs 205 through the UE 115-a more accurately compensating for frequency offsets that may be observed in the received communications. In some cases, the UE 115-a may use a TCI state for communications that is selected based on whether the downlink communications are Doppler pre-compensated or not. Such techniques may be advantageous in cases where relatively large and changing Doppler shifts among TRPs 205 may be present, such as in cases where the UE 115-a may have high mobility and travel at a relatively high rate of speed relative to different TRPs 205 (e.g., in high speed trains where the first TRP 205-a and the second TRP 205-b may have relatively large opposing Doppler shifts).

Figure 3:
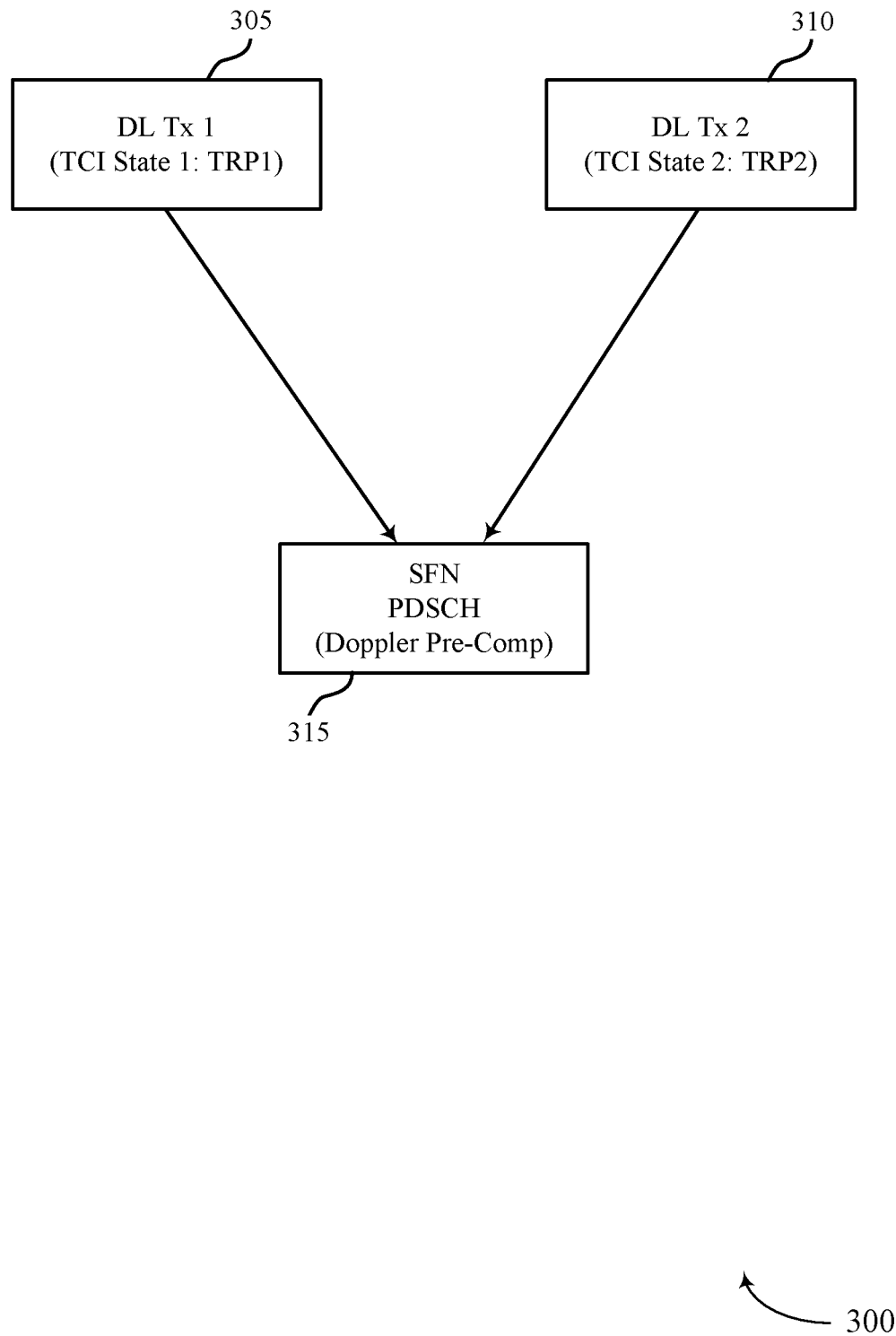
FIG. 3 illustrates an example of a SFN communication with Doppler pre-compensation that supports indication of doppler pre-compensation in multi-TRP communications in accordance with aspects of the present disclosure.

FIG. 3 illustrates an example of a SFN communication with Doppler pre-compensation 300 that supports indication of doppler pre-compensation in multi-TRP communications in accordance with aspects of the present disclosure. In some examples, SFN communication with Doppler pre-compensation 300 may implement aspects of wireless communications system 100 or 200. In this example, one or more TRPs (e.g., TRPs of FIG. 1 or 2) may transmit one or more reference signals that may be used at a UE (e.g., a UE of FIG. 1 or 2) to estimate a Doppler shift associated with the TRP. The UE may transmit an indication of the estimated Doppler shift, and the TRPs may then use this indication to provide Doppler pre-compensation for subsequent communications.

In some cases, as discussed herein, multi-TRP communications may provide SFN transmissions. In the example of FIG. 3, a first downlink communication 305 may be transmitted by a first TRP that is associated with a first TCI state. Likewise, a second downlink communication 310 may be transmitted by a second TRP that is associated with a second TCI state. Both the first downlink communication 305 and the second downlink communication 310 may provide a SFN PDSCH 315, in which each of the component signals from different TRPs may be Doppler pre-compensated. The UE that receives the SFN PDSCH may use the separate TCI states to perform demodulation and decoding of the communications, where DMRS ports of the PDSCH are associated with the different TCI states. In the case where the SFN PDSCH 315 has multiple activated TCI states, each TCI state may indicate a TRP link that could Doppler pre-compensated (e.g., based on a TCI state index that is mapped to Doppler pre-compensation, or a TCI state with RRC parameter for pre-compensation set to enabled).

Figure 4:
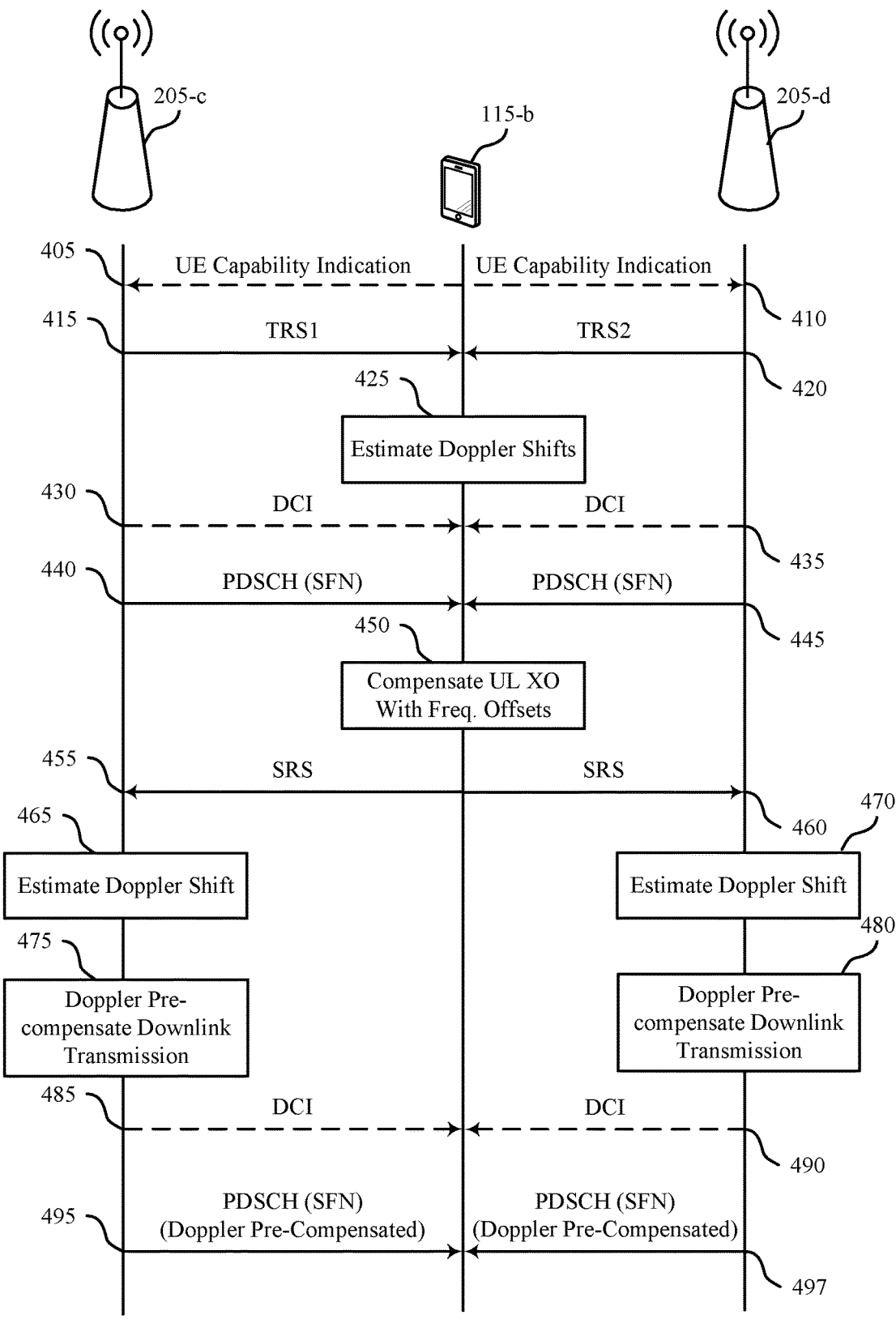
FIG. 4 illustrates an example of a process flow that supports indication of doppler pre-compensation in multi-TRP communications in accordance with aspects of the present disclosure.

FIG. 4 illustrates an example of a process flow 400 that supports indication of doppler pre-compensation in multi-TRP communications in accordance with aspects of the present disclosure. In some examples, process flow 400 may implement aspects of wireless communications system 100 or 200. Process flow may include a UE 115-b, a first TRP 205-c, and a second TRP 205-d, which may each be examples of UEs and TRPs as described with reference to FIGS. 1 and 2. Additionally, TRPs 205 may be a part of a same base station, or be associated with different base stations, that may be examples a base station as described with reference to FIGS. 1 and 2.

At 405, the UE 115-b may optionally transmit a UE capability indication to the first TRP 205-c. The UE capability indication may indicate to the first TRP 205-c that the UE 115-b is capable of estimating a first Doppler shift associated with the first TRP 205-c and a second Doppler shift associated with the second TRP 205-d. At 410, the UE 115-b may optionally transmit a UE capability indication to the second TRP 205-d. That is, the UE 115-b may transmit the UE capability indication to the second TRP 205-d instead of transmitting the UE capability to the first TRP 205-c at 405. In some other cases, the UE 115-b may transmit the UE capability indication to both the first TRP 205-c and the second TRP 205-d.

At 415, the first TRP 205-c may transmit a first TRS (or other reference signal) to the UE 115-b. In some cases, the first TRP 205-c may transmit the reference signal based on receiving a UE capability indication indicating that the UE 115-*b* may estimate a Doppler shift associated with the reference signal. At 430, the second TRP 205-*d* may transmit a second TRS (or other reference signal) to the UE 115-*b*. In some cases, the second TRP 205-*d* may transmit the reference signal based on receiving a UE capability indication indicating that the UE 115-*b* may estimate a Doppler shift associated with the reference signal. In some cases, the reference signals may be a TRS, an SSB transmission, a CSI-RS, or a combination thereof.

At 425, the UE 115-*b* may estimate a first Doppler shift associated with the first TRP 205-*c* and a second Doppler shift associated with the second TRP 205-*d*. In some cases, the UE 115-*b* may estimate the first Doppler shift based on the reference signal received from the first TRP 205-*c*. In some cases, the UE may estimate the second Doppler shift based on the reference signal received from the second TRP 205-*d*.

At 430, the first TRP 205-*c* may optionally transmit DCI that schedules one or more downlink communications transmitted by the first TRP 205-*c* and/or the second TRP 205-*d*. The DCI may also indicate a set of resources for transmitting one or more Doppler shift indications to the first TRP 205-*c* or the second TRP 205-*d*, or both. In some cases, the DCI may additionally indicate a CSI report configuration for transmitting the Doppler shift indications to one or both of the TRPs 205. At 435, the second TRP 205-*d* may optionally transmit DCI that schedules one or more downlink communications transmitted by the second TRP 205-*d* and/or the first TRP 205-*c*. For example, the second TRP 205-*d* may transmit the DCI to the UE 115-*b* in a case that the first TRP 205-*c* does not transmit the DCI to the UE 115-*b*.

At 440, the first TRP 205-*c* may transmit a downlink transmission to the UE 115-*b* via a PDSCH. At 445, the second TRP 205-*d* may transmit a downlink transmission to the UE 115-*b* via the PDSCH. In some cases, the downlink transmissions are SFN communications that are not Doppler pre-compensated. The UE 115-*b* may decode the downlink communications based at least in part on the estimated Doppler shifts associated with each TRP 205. At 450, the UE 115-*b* may compensate an uplink center frequency with frequency offsets that are determined based at least in part on the estimated Doppler shifts associated with each TRP 205.

At 455, the UE 115-*a* may transmit a first SRS to the first TRP 205-*c*. In some cases, the UE may compensate the uplink center frequency for the first SRS based on the first Doppler shift that is estimated for the first TRP 205-*c*. Likewise, at 460, the UE 115-*a* may transmit a second SRS to the second TRP 205-*d*. In some cases, the UE may compensate the uplink center frequency for the second SRS based on the second Doppler shift that is estimated for the second TRP 205-*d*.

At 465, the first TRP 205-*c* may estimate a Doppler shift associated with the SRS from the UE 115-*b*. Likewise, in this example, at 470, the second TRP 205-*d* may also estimate a Doppler shift associated with the SRS from the UE 115-*b*. In some cases, each TRP 205 may measure a frequency offset associated with the UE 115-*b* based on the SRS from the UE 115-*b*, and may determine that its associated Doppler shift is two times the measured frequency offset, based on the assumption that the UE 115-*b* pre-compensated the SRS transmissions (e.g., Doppler shift=2*f2, where f2 is the frequency offset from the uplink signal (SRS) center frequency).

At 475, the first TRP 205-*c* may Doppler pre-compensate a downlink transmission (e.g., a PDSCH transmission) based on the estimated Doppler shift. At 480, the second TRP 205-*d* may Doppler pre-compensate a downlink transmission (e.g., a PDSCH transmission) based on the estimated Doppler shift. In some cases, one or both TRPs 205 may not Doppler pre-compensate their respective downlink transmissions.

Optionally, at 485, the first TRP 205-*c* may transmit a DCI to the UE 115-*b* that schedules another PDSCH communication. In some cases, the DCI may include an indication of whether the PDSCH communication is Doppler pre-compensated or not. Additionally or alternatively, at 490, the second TRP 205-*d* may optionally transmit a DCI to the UE 115-*b* that schedules a PDSCH communication, and the DCI may include an indication of whether the PDSCH communication is Doppler pre-compensated or not. In other cases, one or both TRPs may provide an indication of Doppler pre-compensation through other signaling, such as through implicit indications based on the TCI state, CORESET/SS used for the DCI, a MAC-CE, or any combinations thereof, as discussed herein.

At 495, the first TRP 205-*c* may transmit a Doppler pre-compensated downlink transmission to the UE 115-*b* via a PDSCH. At 497, the second TRP 205-*d* may transmit a Doppler compensated downlink transmission to the UE 115-*b* via the PDSCH. In some cases, the UE 115-*b* may select a TCI state for the PDSCHs based on the Doppler pre-compensation indication, and a QCL relation with the TRPs 205 may change based on the Doppler pre-compensation indication.

Figure 5:
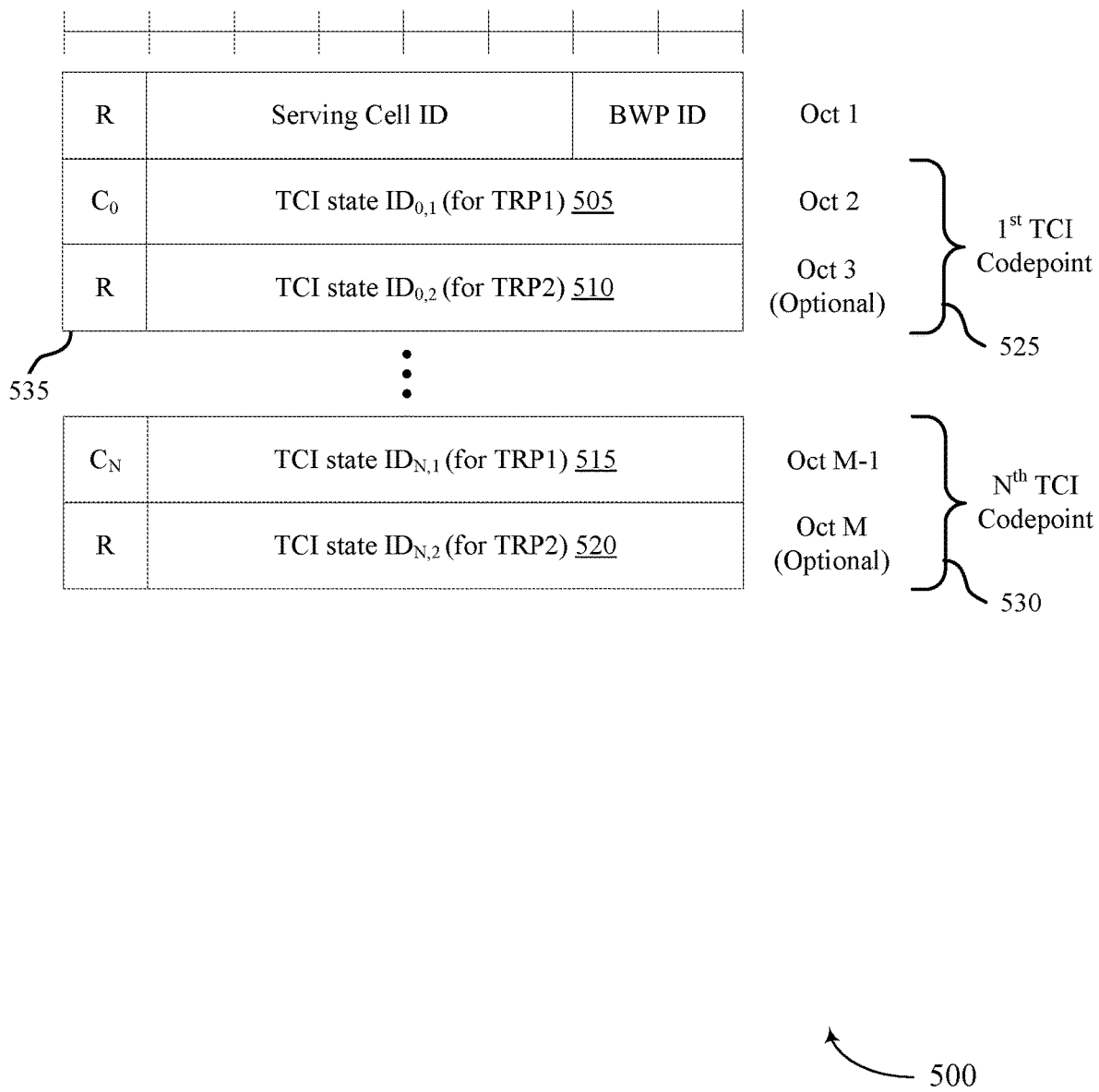
FIG. 5 illustrates an example of a MAC-CE that supports indication of doppler pre-compensation in multi-TRP communications in accordance with aspects of the present disclosure.

FIG. 5 illustrates an example of a MAC-CE 500 that supports indication of doppler pre-compensation in multi-TRP communications in accordance with aspects of the present disclosure. In some examples, MAC-CE 500 may implement aspects of wireless communications system 100 or 200. In this example, MAC-CE 500 may include a number of different TCI state IDs, including a first TCI state ID 505 for a first TRP, a second TCI state ID 510 for a second TRP, and so on, through an $N-1^{th}$ TCI state ID for the first TRP and an $N^{th}$ TCI state ID for the second TRP. As discussed above, in some cases the different TCI state IDs may be mapped to an indication of whether communications associated with the TCI state ID are Doppler pre-compensated or not. The combination of TCI state IDs for the TRPs may be referred to as a TCI codepoint, with a first TCI codepoint 525 and a $N^{th}$ TCI codepoint 530 illustrated in FIG. 5. In some cases, as also discussed above, a reserved bit 535 in the MAC-CE 500 may be used to indicate both Doppler pre-compensation and SFN/non-SFN for an associated downlink communication.

Figure 6:
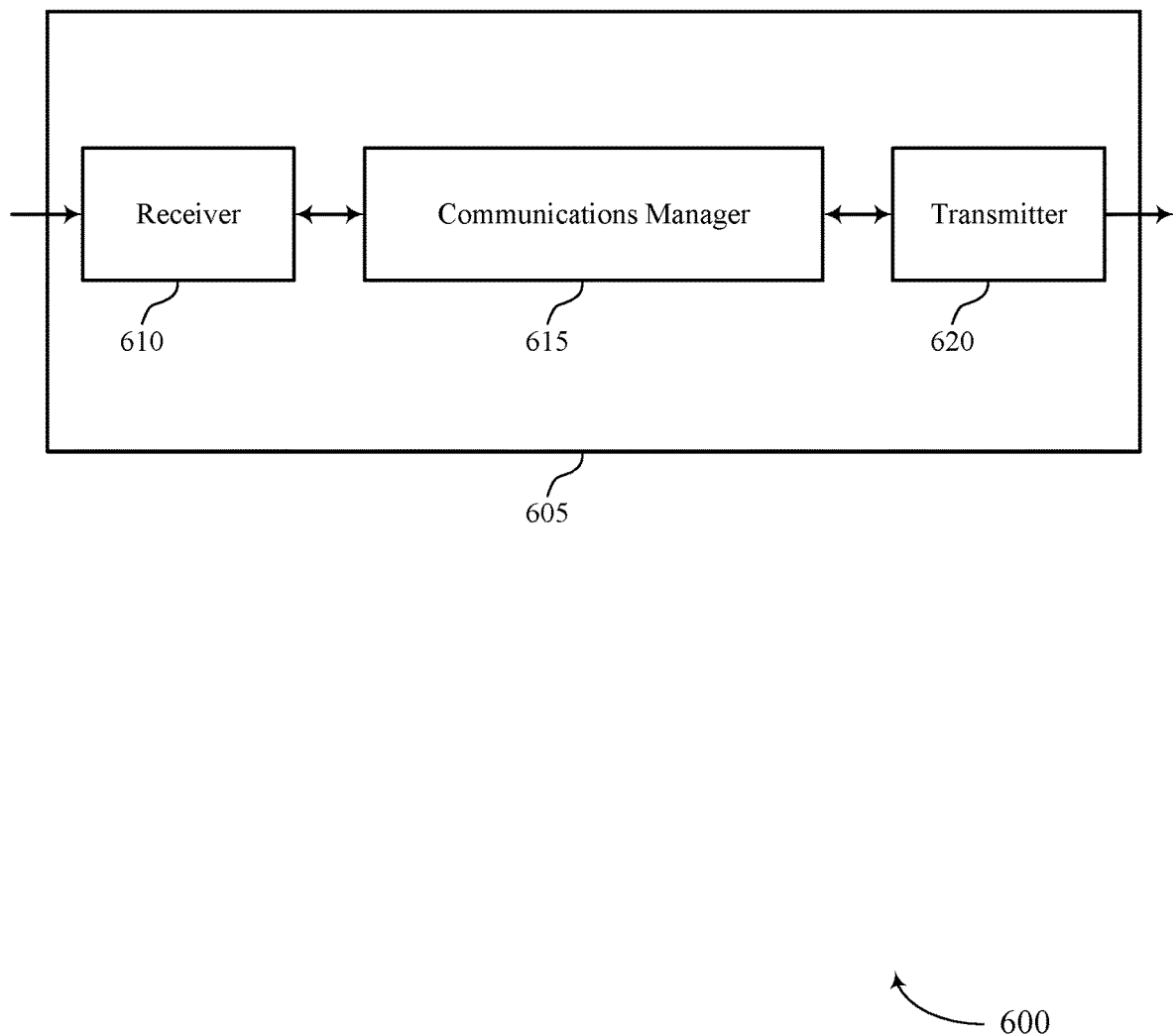
FIGS. 6 and 7 show block diagrams of devices that support indication of doppler pre-compensation in multi-TRP communications in accordance with aspects of the present disclosure.

FIG. 6 shows a block diagram 600 of a device 605 that supports indication of doppler pre-compensation in multi-TRP communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to indication of doppler pre-compensation in multi-TRP communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may estimate a first Doppler shift associated with a first TRP and a second Doppler shift associated with a second TRP, receive a Doppler pre-compensation indication that indicates that one or more of a first communication from the first TRP or a second communication from the second TRP is Doppler pre-compensated based on the first Doppler shift or the second Doppler shift, select, based on the Doppler pre-compensation indication, a first transmission configuration indicator state for the first communication and a second transmission configuration indicator state for the second communication, and receive the first communication based on the first transmission configuration indicator state and the second communication based on the second transmission configuration indicator state. The communications manager 615 may be an example of aspects of the communications manager 910 described herein.

The communications manager 515 may as described herein be implemented to realize one or more potential advantages. One implementation may allow the device 505 to determine whether a received communication is Doppler pre-compensated, which may allow for selection of a TCI state for use in decoding the communication that provides a higher likelihood of successfully demodulating and decoding the communication. Further, implementations may allow the device 505 to increase communications reliability, throughput, and enhance user experience, while reducing overall power consumption, among other advantages.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
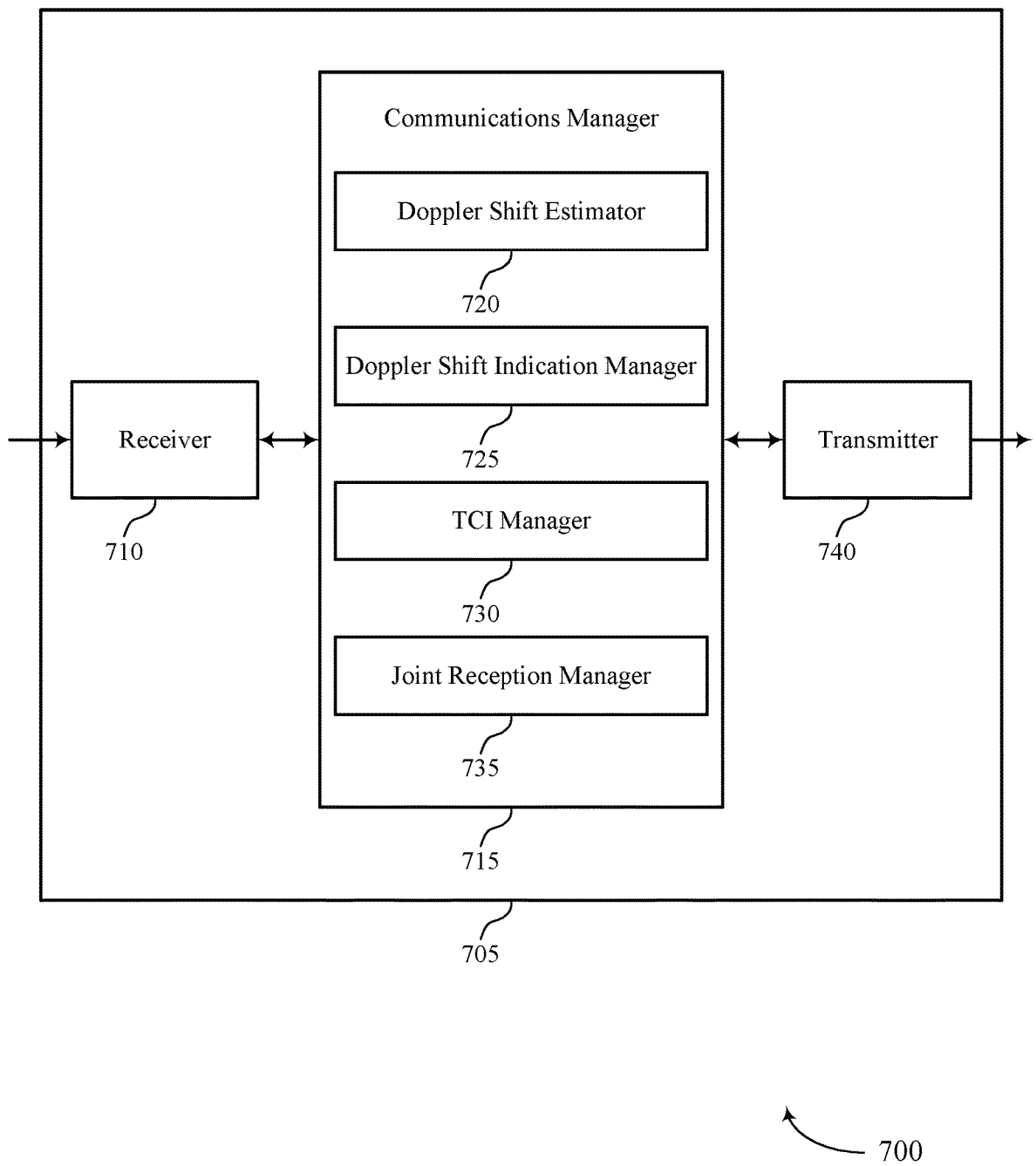

FIG. 7 shows a block diagram 700 of a device 705 that supports indication of doppler pre-compensation in multi-TRP communications in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to indication of doppler pre-compensation in multi-TRP communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a doppler shift estimator 720, a doppler shift indication manager 725, a TCI manager 730, and a joint reception manager 735. The communications manager 715 may be an example of aspects of the communications manager 910 described herein.

The Doppler shift estimator 720 may estimate a first Doppler shift associated with a first TRP and a second Doppler shift associated with a second TRP.

The Doppler shift indication manager 725 may receive a Doppler pre-compensation indication that indicates that one or more of a first communication from the first TRP or a second communication from the second TRP is Doppler pre-compensated based on the first Doppler shift or the second Doppler shift.

The TCI manager 730 may select, based on the Doppler pre-compensation indication, a first transmission configuration indicator state for the first communication and a second transmission configuration indicator state for the second communication.

The joint reception manager 735 may receive the first communication based on the first transmission configuration indicator state and the second communication based on the second transmission configuration indicator state.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
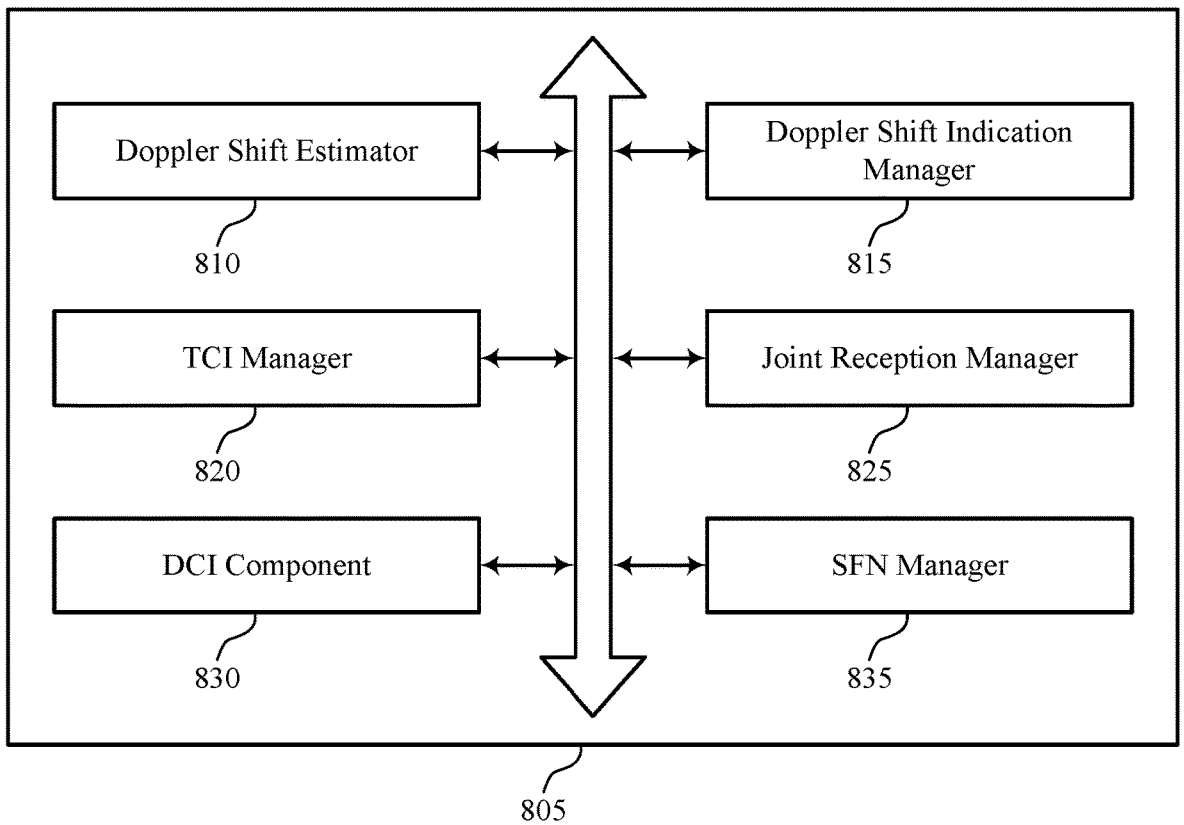
FIG. 8 shows a block diagram of a communications manager that supports indication of doppler pre-compensation in multi-TRP communications in accordance with aspects of the present disclosure.

FIG. 8 shows a block diagram 800 of a communications manager 805 that supports indication of doppler pre-compensation in multi-TRP communications in accordance with aspects of the present disclosure. The communications manager 805 may be an example of aspects of a communications manager 615, a communications manager 715, or a communications manager 910 described herein. The communications manager 805 may include a doppler shift estimator 810, a doppler shift indication manager 815, a TCI manager 820, a joint reception manager 825, a DCI component 830, and a SFN manager 835. Each of these modules may communicate, directly or indirectly, with one another (e.g., via one or more buses).

The Doppler shift estimator 810 may estimate a first Doppler shift associated with a first TRP and a second Doppler shift associated with a second TRP.

The Doppler shift indication manager 815 may receive a Doppler pre-compensation indication that indicates that one or more of a first communication from the first TRP or a second communication from the second TRP is Doppler pre-compensated based on the first Doppler shift or the second Doppler shift. In some examples, the Doppler shift indication manager 815 may receive a MAC-CE from one or more of the first TRP or the second TRP that includes at least one bit that provides the Doppler pre-compensation indication. In some examples, the Doppler shift indication manager 815 may receive a control channel communication that is associated with a control resource set or a search space, where the control channel communication schedules the first communication and the second communication. In some examples, the Doppler shift indication manager 815 may determine whether one or more of the first communication or the second communication are Doppler pre-compensated based on whether the control resource set or the search space is configured with a Doppler pre-compensation parameter.

In some cases, the MAC-CE provides a separate Doppler pre-compensation indication for each of the first TRP and the second TRP, for each of one or more downlink channels, for each of one or more downlink reference signals, or any combinations thereof. In some cases, the MAC-CE includes an activation indication for one or more of the first transmission configuration indicator state or the second transmission configuration indicator state, and an indication of Doppler pre-compensation for each transmission configuration indicator state. In some cases, the control resource set or the search space is configured with the Doppler pre-compensation parameter via radio resource control signaling.

The TCI manager 820 may select, based on the Doppler pre-compensation indication, a first transmission configuration indicator state for the first communication and a second transmission configuration indicator state for the second communication. In some examples, the TCI manager 820 may receive an indication of a change in transmission configuration indicator state from one or more of the first TRP or the second TRP, which may indicate whether Doppler pre-compensation is used. In some examples, the TCI manager 820 may determine whether the indication of the change in transmission configuration indicator state is associated with a quasi-co-location (QCL) type that has a low Doppler spread that indicates Doppler pre-compensation.

In some cases, a subset of transmission configuration indicator states are configured by radio resource control signaling to be associated with Doppler pre-compensation, and where the Doppler pre-compensation indication is determined based on whether the first transmission configuration indicator state or the second transmission configuration indicator state are within the subset of transmission configuration indicator states. In some cases, the Doppler pre-compensation indication is provided separately for each of the first TRP and the second TRP based on one or more active transmission configuration indicator states.

The joint reception manager 825 may receive the first communication based on the first transmission configuration indicator state and the second communication based on the second transmission configuration indicator state.

The DCI component 830 may receive downlink control information from one or more of the first TRP or the second TRP that includes at least one bit that provides the Doppler pre-compensation indication. In some cases, the downlink control information includes a single bit that indicates both the first communication and the second communication are Doppler pre-compensated. In some cases, the downlink control information includes two or more bits that indicate that the first communication is Doppler pre-compensated, the second communication is Doppler pre-compensated, or that both the first communication and the second communication are Doppler pre-compensated.

The SFN manager 835 may receive an indication that the first communication and the second communication are transmitted based on a single frequency network (SFN) configuration or based on a non-SFN configuration. In some examples, the SFN manager 835 may receive a MAC-CE control element that includes one or more bits that indicate whether one or both of the SFN configuration or the non-SFN configuration use Doppler pre-compensation. In some cases, the SFN configuration uses Doppler pre-compensation and the non-SFN configuration does not use Doppler pre-compensation.

Figure 9:
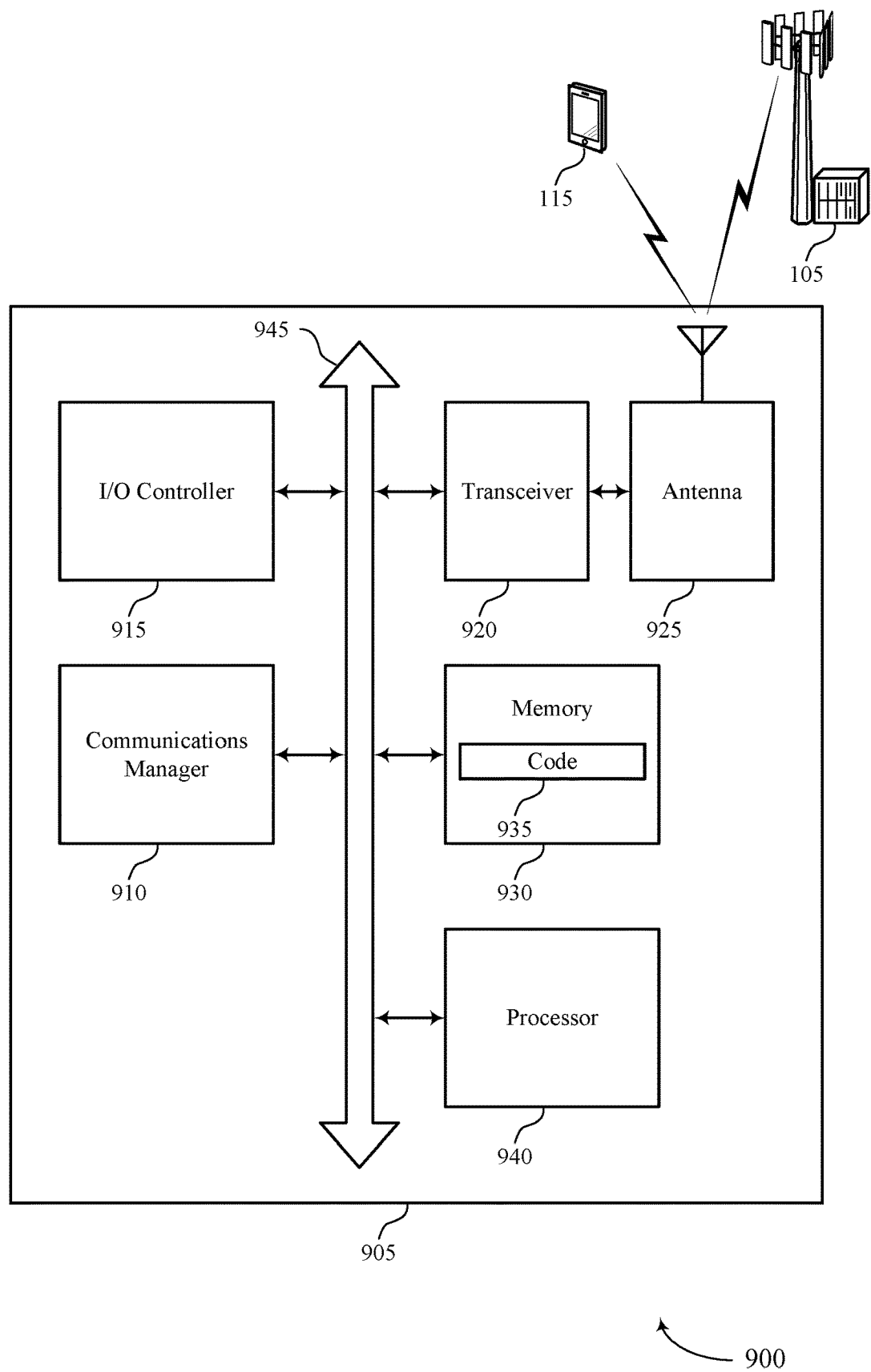
FIG. 9 shows a diagram of a system including a device that supports indication of doppler pre-compensation in multi-TRP communications in accordance with aspects of the present disclosure.

FIG. 9 shows a diagram of a system 900 including a device 905 that supports indication of doppler pre-compensation in multi-TRP communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may estimate a first Doppler shift associated with a first TRP and a second Doppler shift associated with a second TRP, receive a Doppler pre-compensation indication that indicates that one or more of a first communication from the first TRP or a second communication from the second TRP is Doppler pre-compensated based on the first Doppler shift or the second Doppler shift, select, based on the Doppler pre-compensation indication, a first transmission configuration indicator state for the first communication and a second transmission configuration indicator state for the second communication, and receive the first communication based on the first transmission configuration indicator state and the second communication based on the second transmission configuration indicator state.

The communications manager 910 may as described herein be implemented to realize one or more potential advantages. One implementation may allow the device 905 to determine whether a received communication is Doppler pre-compensated, which may allow for selection of a TCI state for use in decoding the communication that provides a higher likelihood of successfully demodulating and decoding the communication. Further, implementations may allow the device 905 to increase communications reliability, throughput, and enhance user experience, while reducing overall power consumption, among other advantages.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting indication of doppler pre-compensation in multi-TRP communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
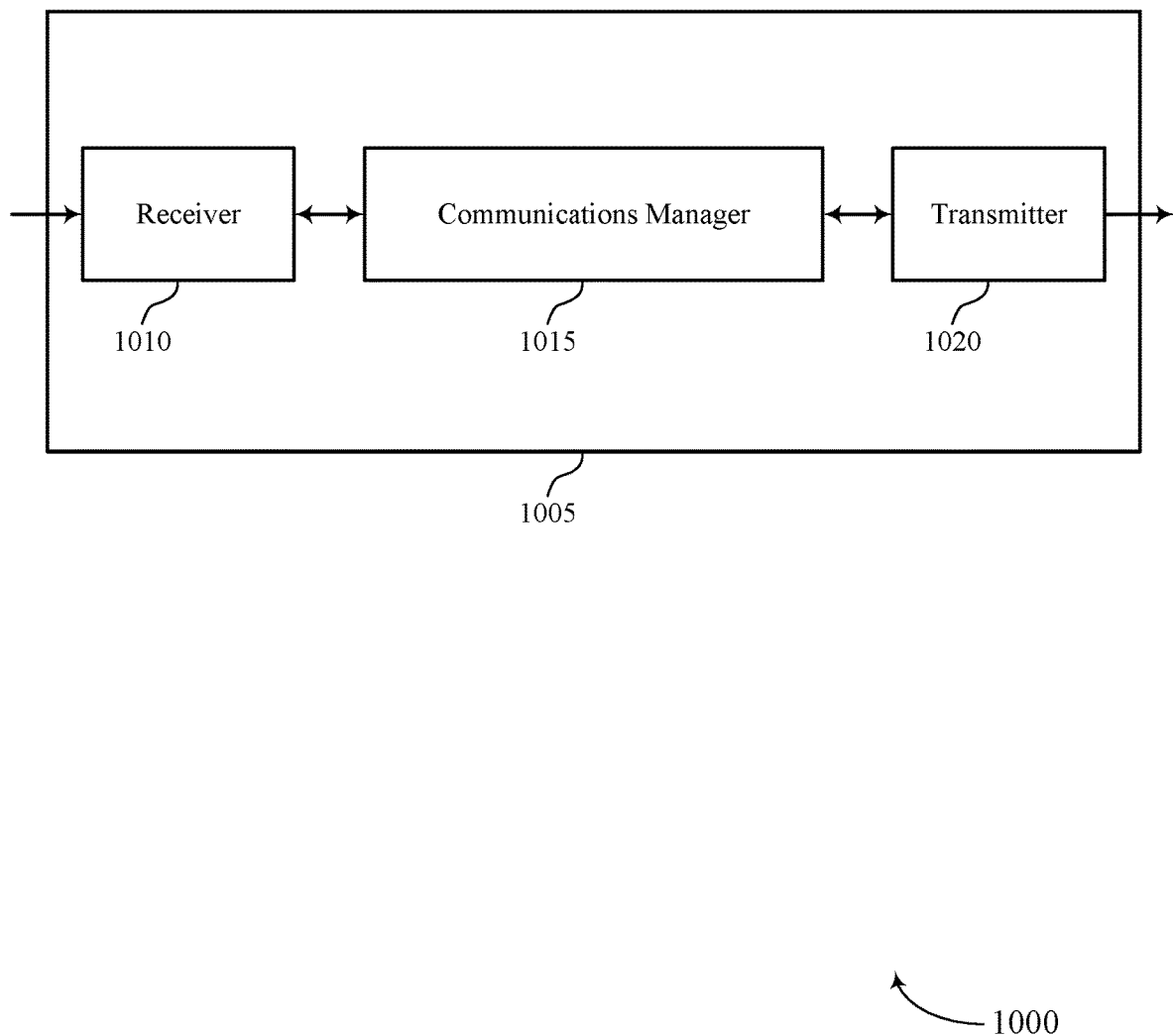
FIGS. 10 and 11 show block diagrams of devices that support indication of doppler pre-compensation in multi-TRP communications in accordance with aspects of the present disclosure.

FIG. 10 shows a block diagram 1000 of a device 1005 that supports indication of doppler pre-compensation in multi-TRP communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to indication of doppler pre-compensation in multi-TRP communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may estimate a first Doppler shift associated with a first UE, determine that Doppler pre-compensation is to be used for a first communication to the UE from the first TRP, transmit a Doppler pre-compensation indication to the first UE that indicates that one or more of the first communication from the first TRP or a second communication from a second TRP is Doppler pre-compensated, and transmit the first communication to the first UE, where the first communication is Doppler pre-compensated based on the first Doppler shift. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
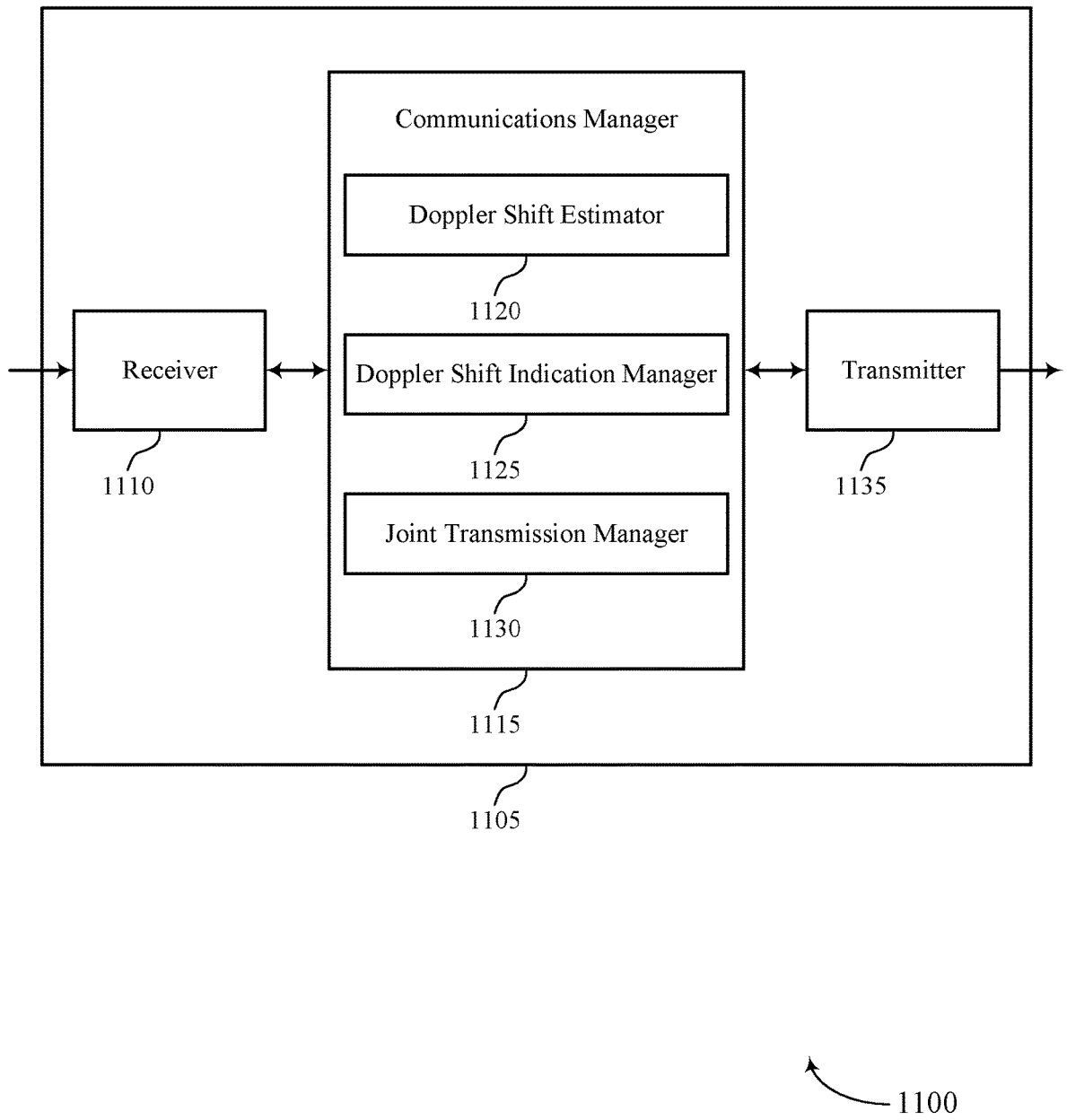

FIG. 11 shows a block diagram 1100 of a device 1105 that supports indication of doppler pre-compensation in multi-TRP communications in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to indication of doppler pre-compensation in multi-TRP communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a doppler shift estimator 1120, a doppler shift indication manager 1125, and a joint transmission manager 1130. The communications manager 1115 may be an example of aspects of the communications manager 1310 described herein.

The Doppler shift estimator 1120 may estimate a first Doppler shift associated with a first UE.

The Doppler shift indication manager 1125 may determine that Doppler pre-compensation is to be used for a first communication to the UE from the first TRP and transmit a Doppler pre-compensation indication to the first UE that indicates that one or more of the first communication from the first TRP or a second communication from a second TRP is Doppler pre-compensated.

The joint transmission manager 1130 may transmit the first communication to the first UE, where the first communication is Doppler pre-compensated based on the first Doppler shift.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
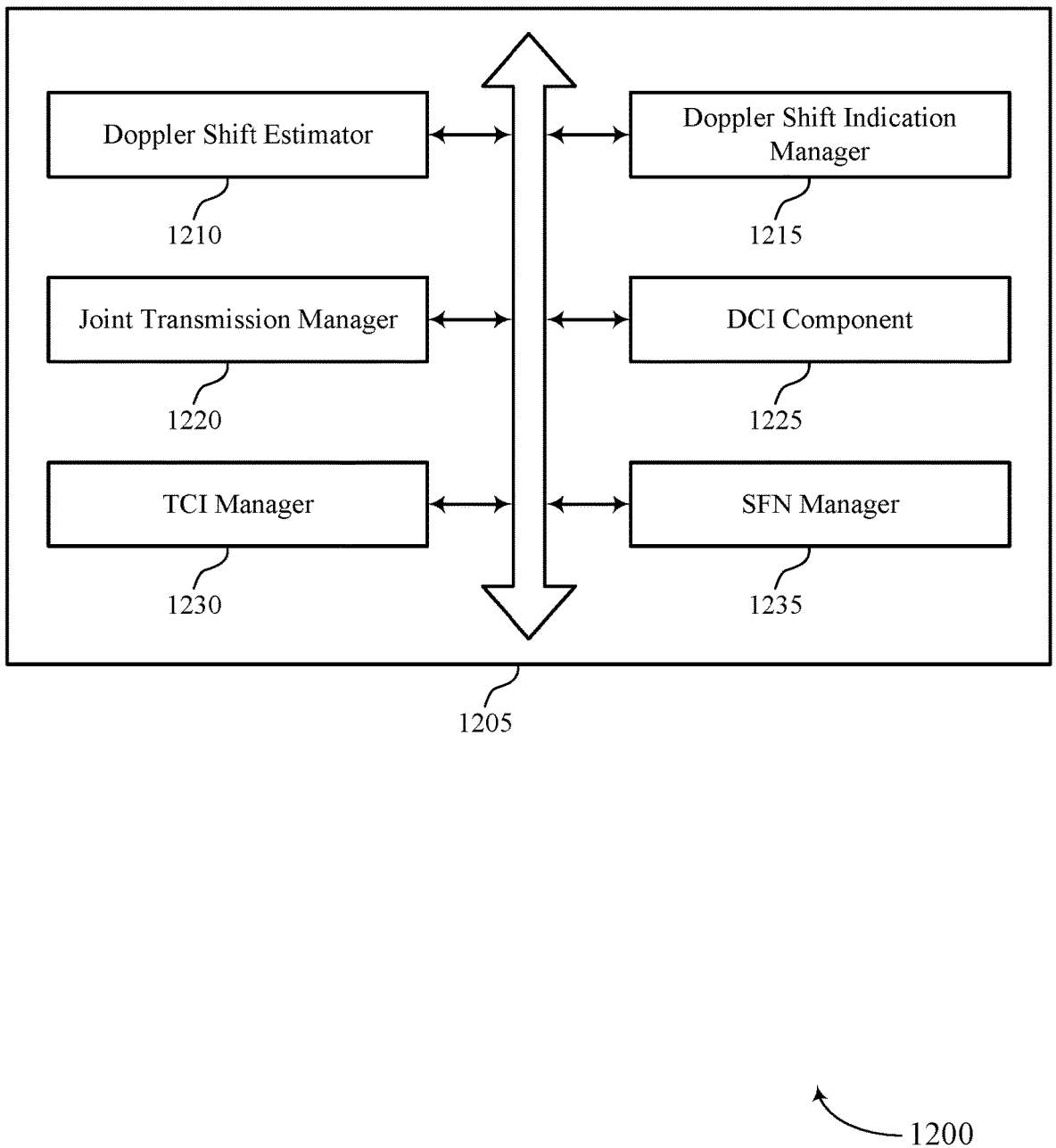
FIG. 12 shows a block diagram of a communications manager that supports indication of doppler pre-compensation in multi-TRP communications in accordance with aspects of the present disclosure.

FIG. 12 shows a block diagram 1200 of a communications manager 1205 that supports indication of doppler pre-compensation in multi-TRP communications in accordance with aspects of the present disclosure. The communications manager 1205 may be an example of aspects of a communications manager 1015, a communications manager 1115, or a communications manager 1310 described herein. The communications manager 1205 may include a doppler shift estimator 1210, a doppler shift indication manager 1215, a joint transmission manager 1220, a DCI component 1225, a TCI manager 1230, and a SFN manager 1235. Each of these modules may communicate, directly or indirectly, with one another (e.g., via one or more buses).

The Doppler shift estimator 1210 may estimate a first Doppler shift associated with a first UE.

The Doppler shift indication manager 1215 may determine that Doppler pre-compensation is to be used for a first communication to the UE from the first TRP. In some examples, the Doppler shift indication manager 1215 may transmit a Doppler pre-compensation indication to the first UE that indicates that one or more of the first communication from the first TRP or a second communication from a second TRP is Doppler pre-compensated. In some examples, the Doppler shift indication manager 1215 may transmit a MAC-CE to the first UE that includes at least one bit that provides the Doppler pre-compensation indication.

In some examples, the Doppler shift indication manager 1215 may transmit a control channel communication to the first UE that is associated with a control resource set or a search space, where the control channel communication schedules the first communication and the second communication. In some examples, whether one or more of the first communication or the second communication are Doppler pre-compensated is determined based on whether the control resource set or the search space is configured with a Doppler pre-compensation parameter.

In some cases, the MAC-CE provides a separate Doppler pre-compensation indication for each of the first TRP and the second TRP, for each of one or more downlink channels, for each of one or more downlink reference signals, or any combinations thereof. In some cases, the MAC-CE includes an activation indication for a first transmission configuration indicator state associated with the first TRP, and an indication of Doppler pre-compensation for the first transmission configuration indicator state. In some cases, the control resource set or the search space is configured with the Doppler pre-compensation parameter via radio resource control signaling.

The joint transmission manager 1220 may transmit the first communication to the first UE, where the first communication is Doppler pre-compensated based on the first Doppler shift.

The DCI component 1225 may transmit downlink control information to the first UE includes at least one bit that provides the Doppler pre-compensation indication. In some cases, the downlink control information includes a single bit that indicates both the first communication and the second communication are Doppler pre-compensated. In some cases, the downlink control information includes two or more bits that indicate that the first communication is Doppler pre-compensated, the second communication is Doppler pre-compensated, or that both the first communication and the second communication are Doppler pre-compensated.

The TCI manager 1230 may transmit an indication of a change in transmission configuration indicator state from one or more of the first TRP or the second TRP. In some cases, the indication of the change in transmission configuration indicator state is associated with a quasi-co-location (QCL) type that has a low Doppler spread that indicates Doppler pre-compensation. In some cases, a subset of transmission configuration indicator states are configured by radio resource control signaling to be associated with Doppler pre-compensation, and where the Doppler pre-compensation indication is based on whether the transmission configuration indicator state associated with one or more of the first TRP or the second TRP is within the subset of transmission configuration indicator states. In some cases, the Doppler pre-compensation indication is provided separately for each of the first TRP and the second TRP based on one or more active transmission configuration indicator states.

The SFN manager 1235 may transmit an indication that the first communication and the second communication are transmitted based on a single frequency network (SFN) configuration or based on a non-SFN configuration. In some examples, the SFN manager 1235 may transmit a MAC-CE that includes one or more bits that indicate whether one or both of the SFN configuration or the non-SFN configuration use Doppler pre-compensation. In some cases, the SFN configuration uses Doppler pre-compensation and the non-SFN configuration does not use Doppler pre-compensation.

Figure 13:
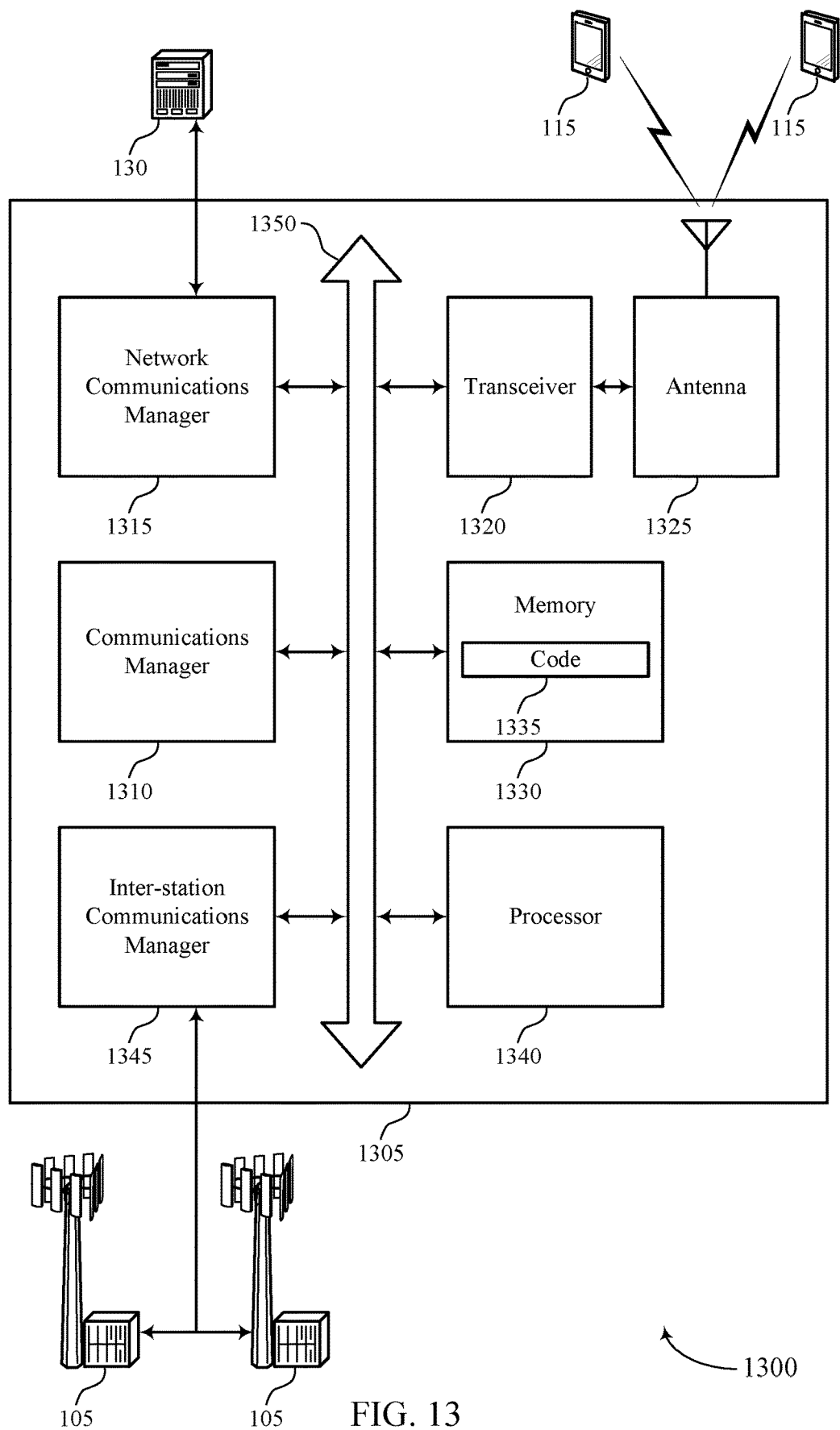
FIG. 13 shows a diagram of a system including a device that supports indication of doppler pre-compensation in multi-TRP communications in accordance with aspects of the present disclosure.

FIG. 13 shows a diagram of a system 1300 including a device 1305 that supports indication of doppler pre-compensation in multi-TRP communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may estimate a first Doppler shift associated with a first UE, determine that Doppler pre-compensation is to be used for a first communication to the UE from the first TRP, transmit a Doppler pre-compensation indication to the first UE that indicates that one or more of the first communication from the first TRP or a second communication from a second TRP is Doppler pre-compensated, and transmit the first communication to the first UE, where the first communication is Doppler pre-compensated based on the first Doppler shift.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting indication of doppler pre-compensation in multi-TRP communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
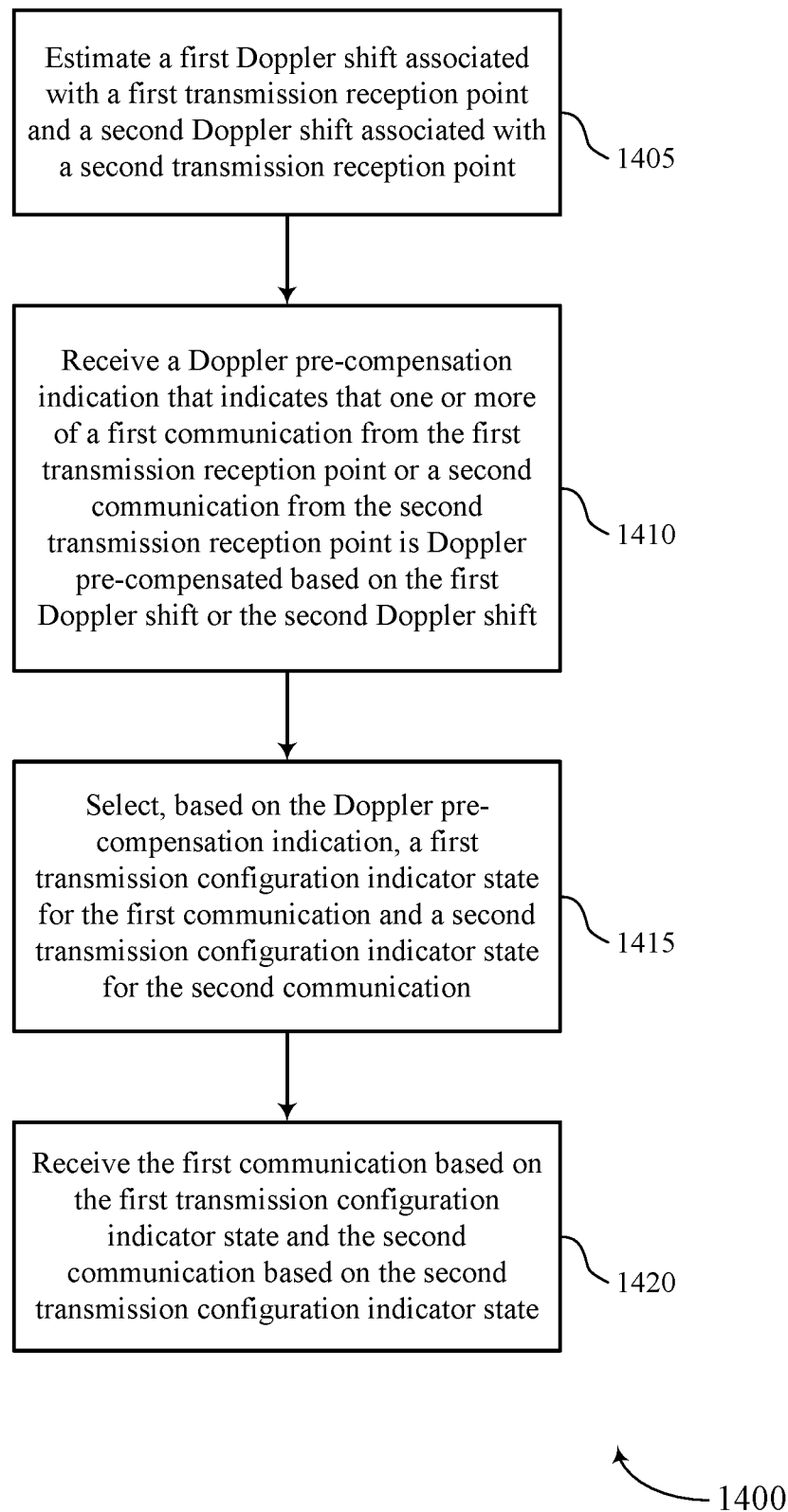
FIGS. 14 through 19 show flowcharts illustrating methods that support indication of doppler pre-compensation in multi-TRP communications in accordance with aspects of the present disclosure.

FIG. 14 shows a flowchart illustrating a method 1400 that supports indication of doppler pre-compensation in multi-TRP communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may estimate a first Doppler shift associated with a first TRP and a second Doppler shift associated with a second TRP. The operations of 1405 may be performed according to the methods described herein. In some examples, aspects of the operations of 1405 may be performed by a Doppler shift estimator as described with reference to FIGS. 6 through 9.

At 1410, the UE may receive a Doppler pre-compensation indication that indicates that one or more of a first communication from the first TRP or a second communication from the second TRP is Doppler pre-compensated based on the first Doppler shift or the second Doppler shift. The operations of 1410 may be performed according to the methods described herein. In some examples, aspects of the operations of 1410 may be performed by a Doppler shift indication manager as described with reference to FIGS. 6 through 9.

At 1415, the UE may select, based on the Doppler pre-compensation indication, a first transmission configuration indicator state for the first communication and a second transmission configuration indicator state for the second communication. The operations of 1415 may be performed according to the methods described herein. In some examples, aspects of the operations of 1415 may be performed by a TCI manager as described with reference to FIGS. 6 through 9.

At 1420, the UE may receive the first communication based on the first transmission configuration indicator state and the second communication based on the second transmission configuration indicator state. The operations of 1420 may be performed according to the methods described herein. In some examples, aspects of the operations of 1420 may be performed by a joint reception manager as described with reference to FIGS. 6 through 9.

Figure 15:
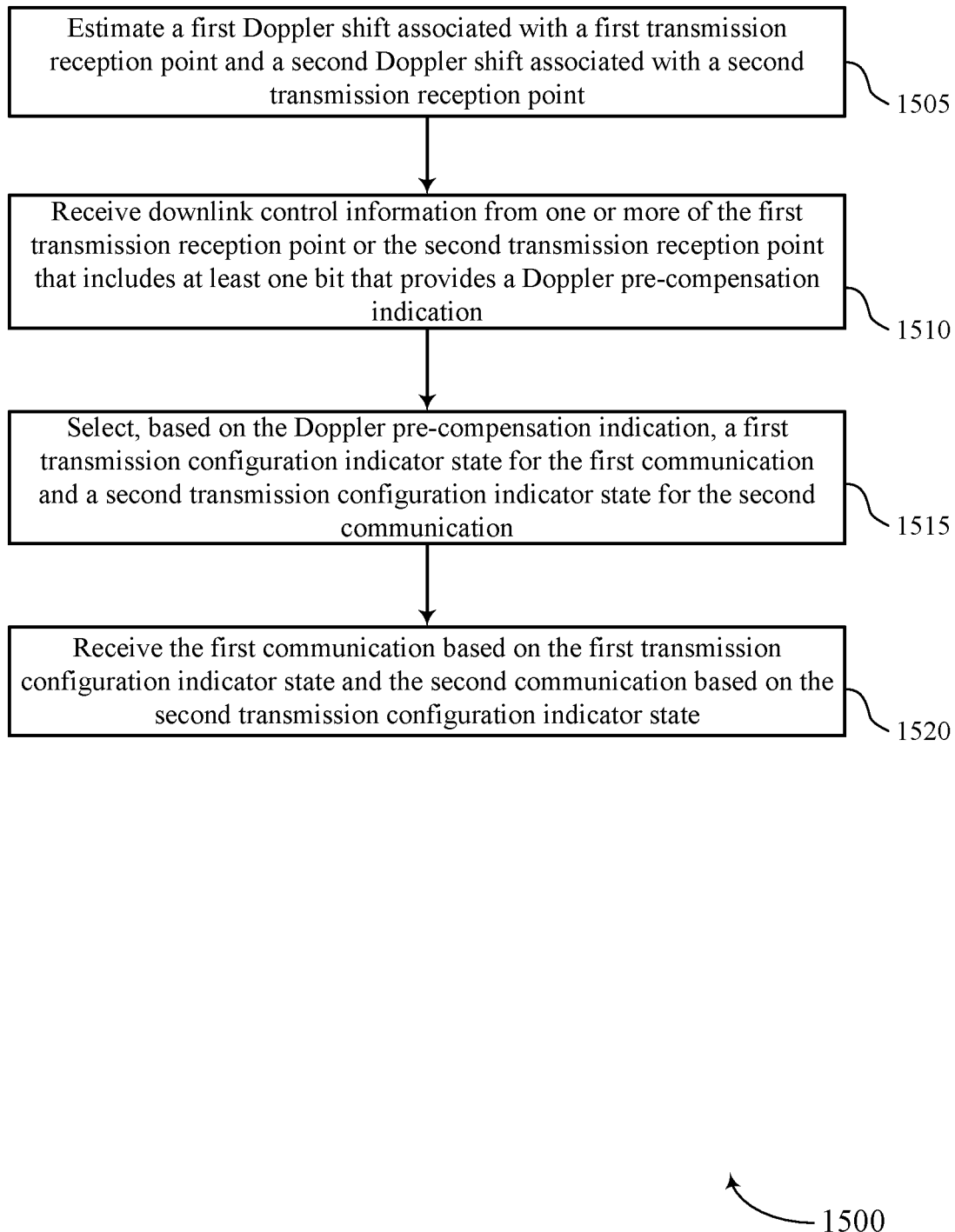

FIG. 15 shows a flowchart illustrating a method 1500 that supports indication of doppler pre-compensation in multi-TRP communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may estimate a first Doppler shift associated with a first TRP and a second Doppler shift associated with a second TRP. The operations of 1505 may be performed according to the methods described herein. In some examples, aspects of the operations of 1505 may be performed by a Doppler shift estimator as described with reference to FIGS. 6 through 9.

At 1510, the UE may receive downlink control information from one or more of the first TRP or the second TRP that includes at least one bit that provides a Doppler pre-compensation indication, that indicates that one or more of a first communication from the first TRP or a second communication from the second TRP is Doppler pre-compensated based on the first Doppler shift or the second Doppler shift. The operations of 1510 may be performed according to the methods described herein. In some examples, aspects of the operations of 1510 may be performed by a DCI component as described with reference to FIGS. 6 through 9. In some cases, the downlink control information includes a single bit that indicates both the first communication and the second communication are Doppler pre-compensated. In some cases, the downlink control information includes two or more bits that indicate that the first communication is Doppler pre-compensated, the second communication is Doppler pre-compensated, or that both the first communication and the second communication are Doppler pre-compensated.

At 1515, the UE may select, based on the Doppler pre-compensation indication, a first transmission configuration indicator state for the first communication and a second transmission configuration indicator state for the second communication. The operations of 1515 may be performed according to the methods described herein. In some examples, aspects of the operations of 1515 may be performed by a TCI manager as described with reference to FIGS. 6 through 9.

At 1520, the UE may receive the first communication based on the first transmission configuration indicator state and the second communication based on the second transmission configuration indicator state. The operations of 1520 may be performed according to the methods described herein. In some examples, aspects of the operations of 1520 may be performed by a joint reception manager as described with reference to FIGS. 6 through 9.

Figure 16:
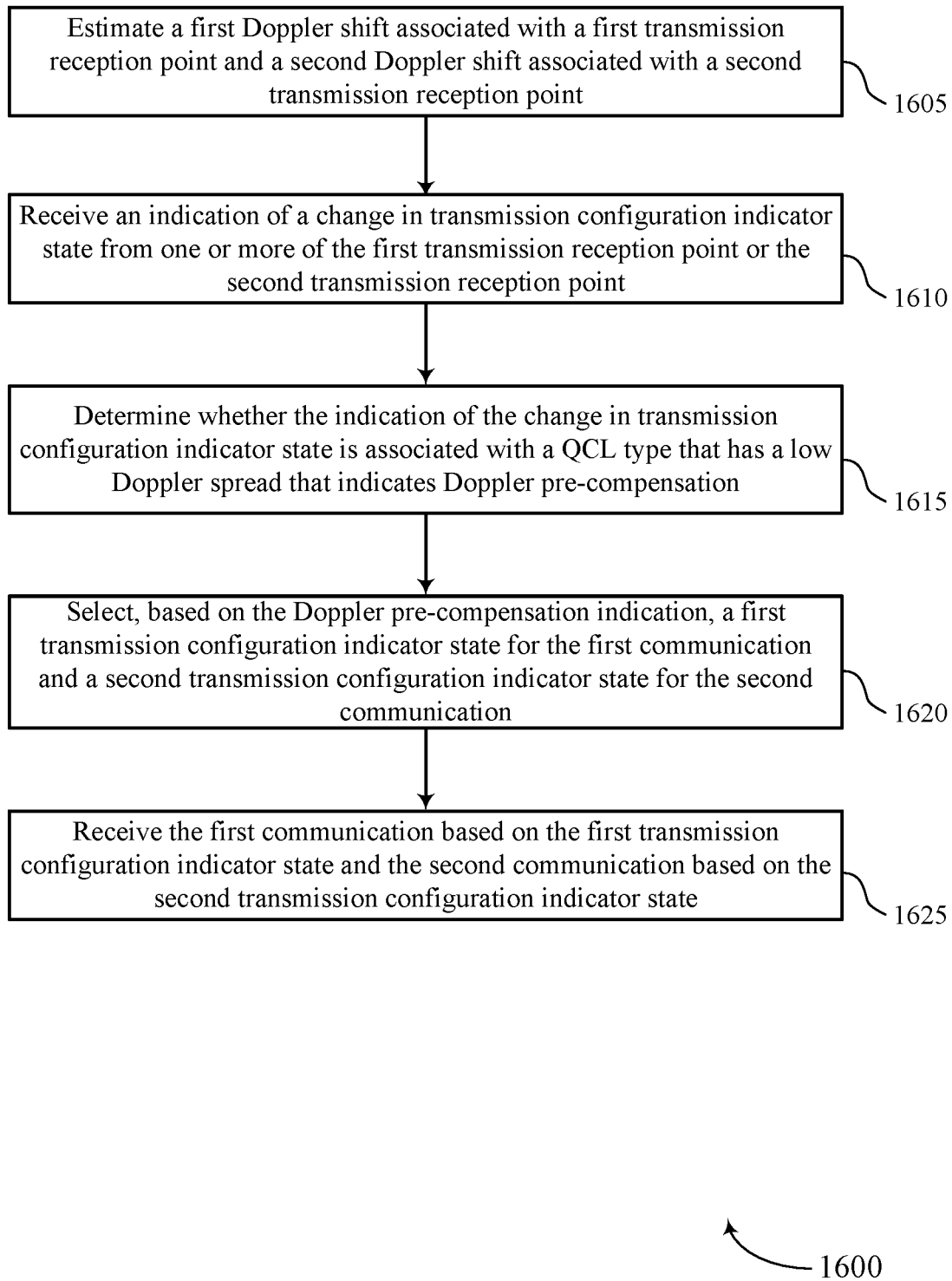

FIG. 16 shows a flowchart illustrating a method 1600 that supports indication of doppler pre-compensation in multi-TRP communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may estimate a first Doppler shift associated with a first TRP and a second Doppler shift associated with a second TRP. The operations of 1605 may be performed according to the methods described herein. In some examples, aspects of the operations of 1605 may be performed by a Doppler shift estimator as described with reference to FIGS. 6 through 9.

At 1610, the UE may receive an indication of a change in transmission configuration indicator state from one or more of the first TRP or the second TRP. In some cases, the change in transmission configuration indicator state provides the Doppler pre-compensation indicator that indicates that one or more of a first communication from the first TRP or a second communication from the second TRP is Doppler pre-compensated based on the first Doppler shift or the second Doppler shift. The operations of 1610 may be performed according to the methods described herein. In some examples, aspects of the operations of 1610 may be performed by a TCI manager as described with reference to FIGS. 6 through 9. In some cases, a subset of transmission configuration indicator states are configured by radio resource control signaling to be associated with Doppler pre-compensation, and where the Doppler pre-compensation indication is determined based on whether the first transmission configuration indicator state or the second transmission configuration indicator state are within the subset of transmission configuration indicator states. In some cases, the Doppler pre-compensation indication is provided separately for each of the first TRP and the second TRP based on one or more active transmission configuration indicator states.

At 1615, the UE may determine whether the indication of the change in transmission configuration indicator state is associated with a quasi-co-location (QCL) type that has a low Doppler spread that indicates Doppler pre-compensation. The operations of 1615 may be performed according to the methods described herein. In some examples, aspects of the operations of 1615 may be performed by a TCI manager as described with reference to FIGS. 6 through 9.

At 1620, the UE may select, based on the Doppler pre-compensation indication, a first transmission configuration indicator state for the first communication and a second transmission configuration indicator state for the second communication. The operations of 1620 may be performed according to the methods described herein. In some examples, aspects of the operations of 1620 may be performed by a TCI manager as described with reference to FIGS. 6 through 9.

At 1625, the UE may receive the first communication based on the first transmission configuration indicator state and the second communication based on the second transmission configuration indicator state. The operations of 1625 may be performed according to the methods described herein. In some examples, aspects of the operations of 1625 may be performed by a joint reception manager as described with reference to FIGS. 6 through 9.

Figure 17:
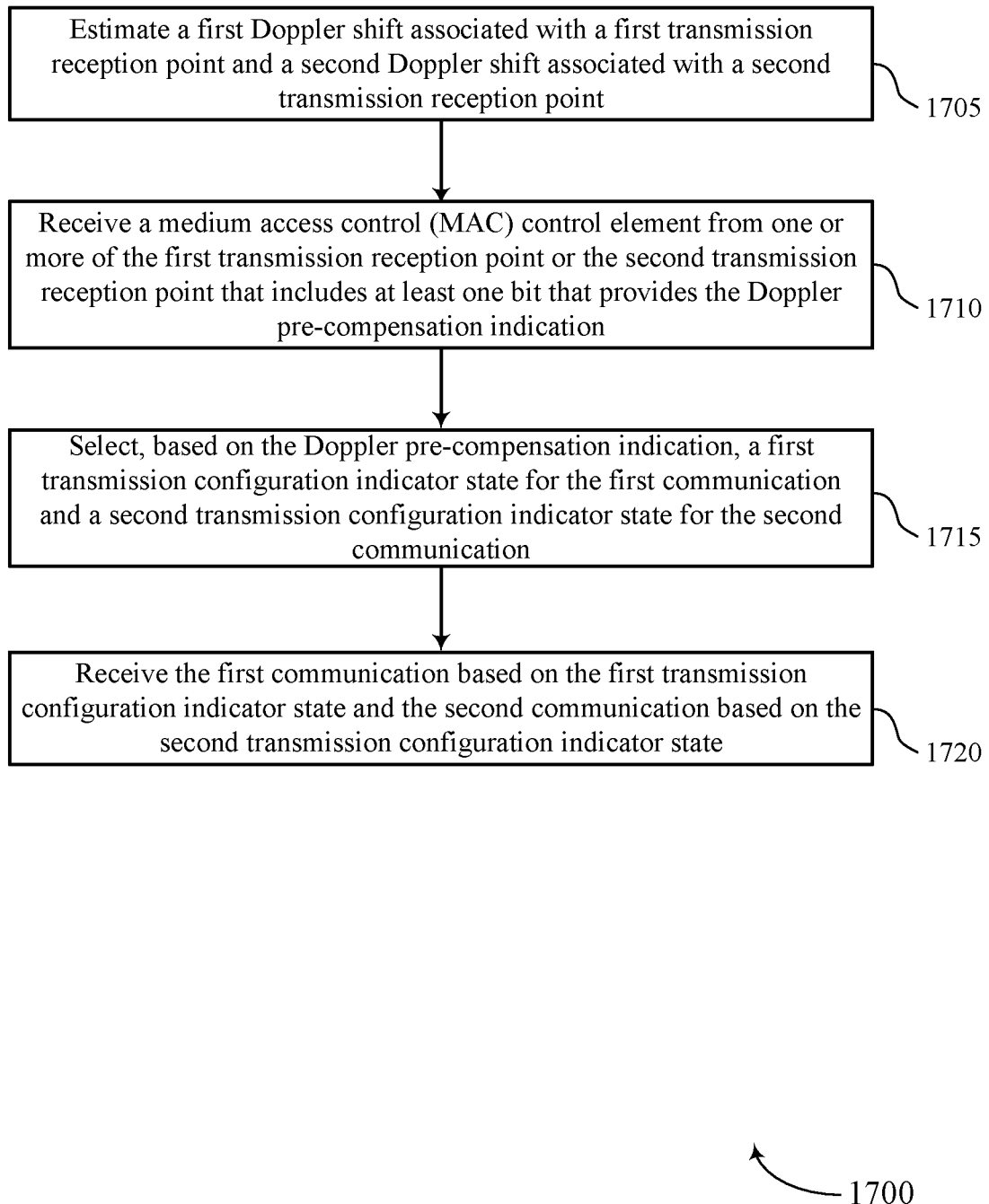

FIG. 17 shows a flowchart illustrating a method 1700 that supports indication of doppler pre-compensation in multi-TRP communications in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may estimate a first Doppler shift associated with a first TRP and a second Doppler shift associated with a second TRP. The operations of 1705 may be performed according to the methods described herein. In some examples, aspects of the operations of 1705 may be performed by a Doppler shift estimator as described with reference to FIGS. 6 through 9.

At 1710, the UE may receive a MAC-CE from one or more of the first TRP or the second TRP that includes at least one bit that provides a Doppler pre-compensation indication, that indicates that one or more of a first communication from the first TRP or a second communication from the second TRP is Doppler pre-compensated based on the first Doppler shift or the second Doppler shift. The operations of 1710 may be performed according to the methods described herein. In some examples, aspects of the operations of 1710 may be performed by a Doppler shift indication manager as described with reference to FIGS. 6 through 9. In some cases, the MAC-CE provides a separate Doppler pre-compensation indication for each of the first TRP and the second TRP, for each of one or more downlink channels, for each of one or more downlink reference signals, or any combinations thereof. In some cases, the MAC-CE includes an activation indication for one or more of the first transmission configuration indicator state or the second transmission configuration indicator state, and an indication of Doppler pre-compensation for each transmission configuration indicator state.

At 1715, the UE may select, based on the Doppler pre-compensation indication, a first transmission configuration indicator state for the first communication and a second transmission configuration indicator state for the second communication. The operations of 1715 may be performed according to the methods described herein. In some examples, aspects of the operations of 1715 may be performed by a TCI manager as described with reference to FIGS. 6 through 9.

At 1720, the UE may receive the first communication based on the first transmission configuration indicator state and the second communication based on the second transmission configuration indicator state. The operations of 1720 may be performed according to the methods described herein. In some examples, aspects of the operations of 1720 may be performed by a joint reception manager as described with reference to FIGS. 6 through 9.

Figure 18:
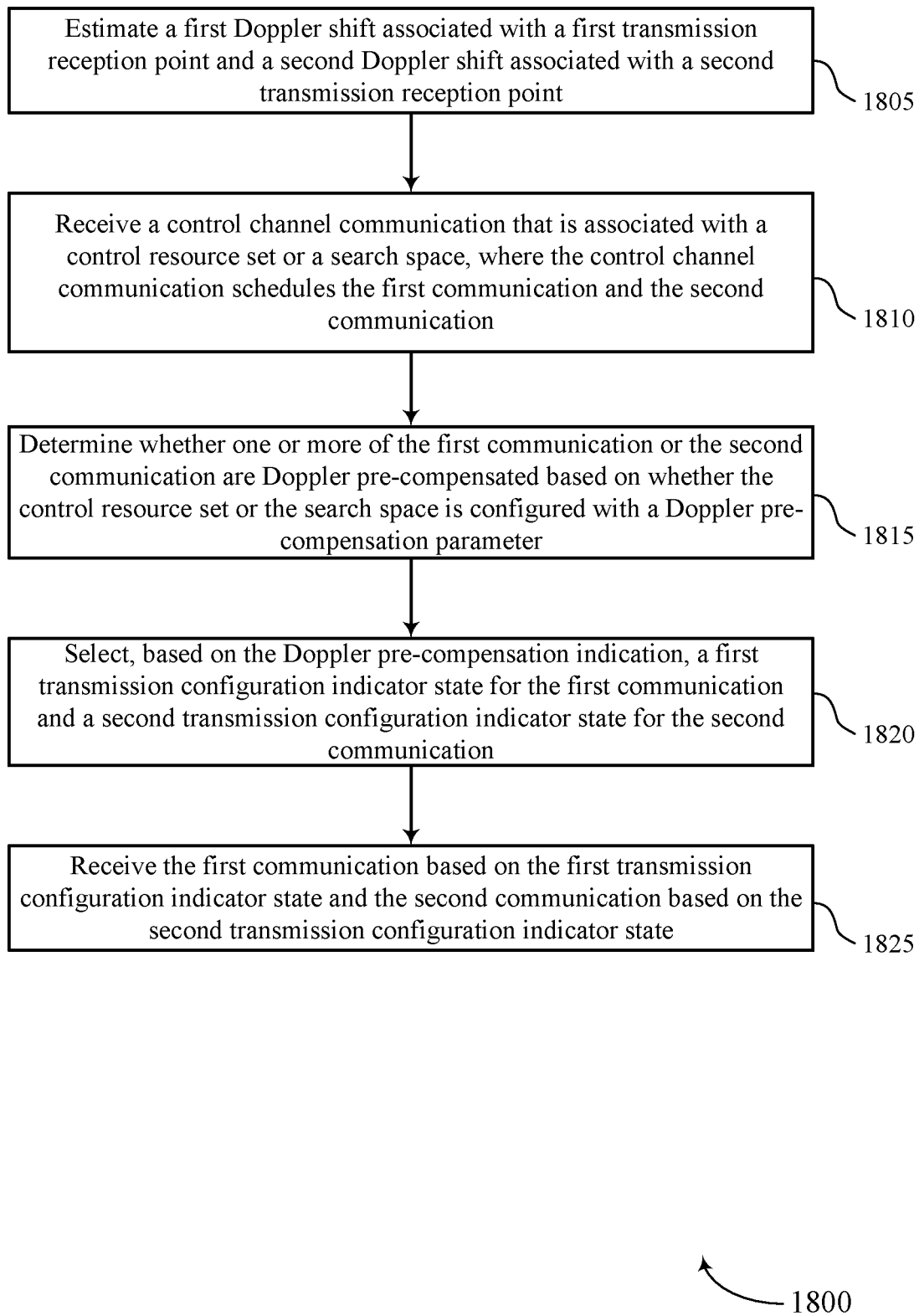

FIG. 18 shows a flowchart illustrating a method 1800 that supports indication of doppler pre-compensation in multi-TRP communications in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may estimate a first Doppler shift associated with a first TRP and a second Doppler shift associated with a second TRP. The operations of 1805 may be performed according to the methods described herein. In some examples, aspects of the operations of 1805 may be performed by a Doppler shift estimator as described with reference to FIGS. 6 through 9.

At 1810, the UE may receive a control channel communication that is associated with a control resource set or a search space, where the control channel communication schedules the first communication and the second communication. The operations of 1810 may be performed according to the methods described herein. In some examples, aspects of the operations of 1810 may be performed by a Doppler shift indication manager as described with reference to FIGS. 6 through 9.

At 1815, the UE may determine whether one or more of the first communication or the second communication are Doppler pre-compensated based on whether the control resource set or the search space is configured with a Doppler pre-compensation parameter. The operations of 1815 may be performed according to the methods described herein. In some examples, aspects of the operations of 1815 may be performed by a Doppler shift indication manager as described with reference to FIGS. 6 through 9.

At 1820, the UE may select, based on the Doppler pre-compensation indication, a first transmission configuration indicator state for the first communication and a second transmission configuration indicator state for the second communication. The operations of 1820 may be performed according to the methods described herein. In some examples, aspects of the operations of 1820 may be performed by a TCI manager as described with reference to FIGS. 6 through 9.

At 1825, the UE may receive the first communication based on the first transmission configuration indicator state and the second communication based on the second transmission configuration indicator state. The operations of 1825 may be performed according to the methods described herein. In some examples, aspects of the operations of 1825 may be performed by a joint reception manager as described with reference to FIGS. 6 through 9.

Figure 19:
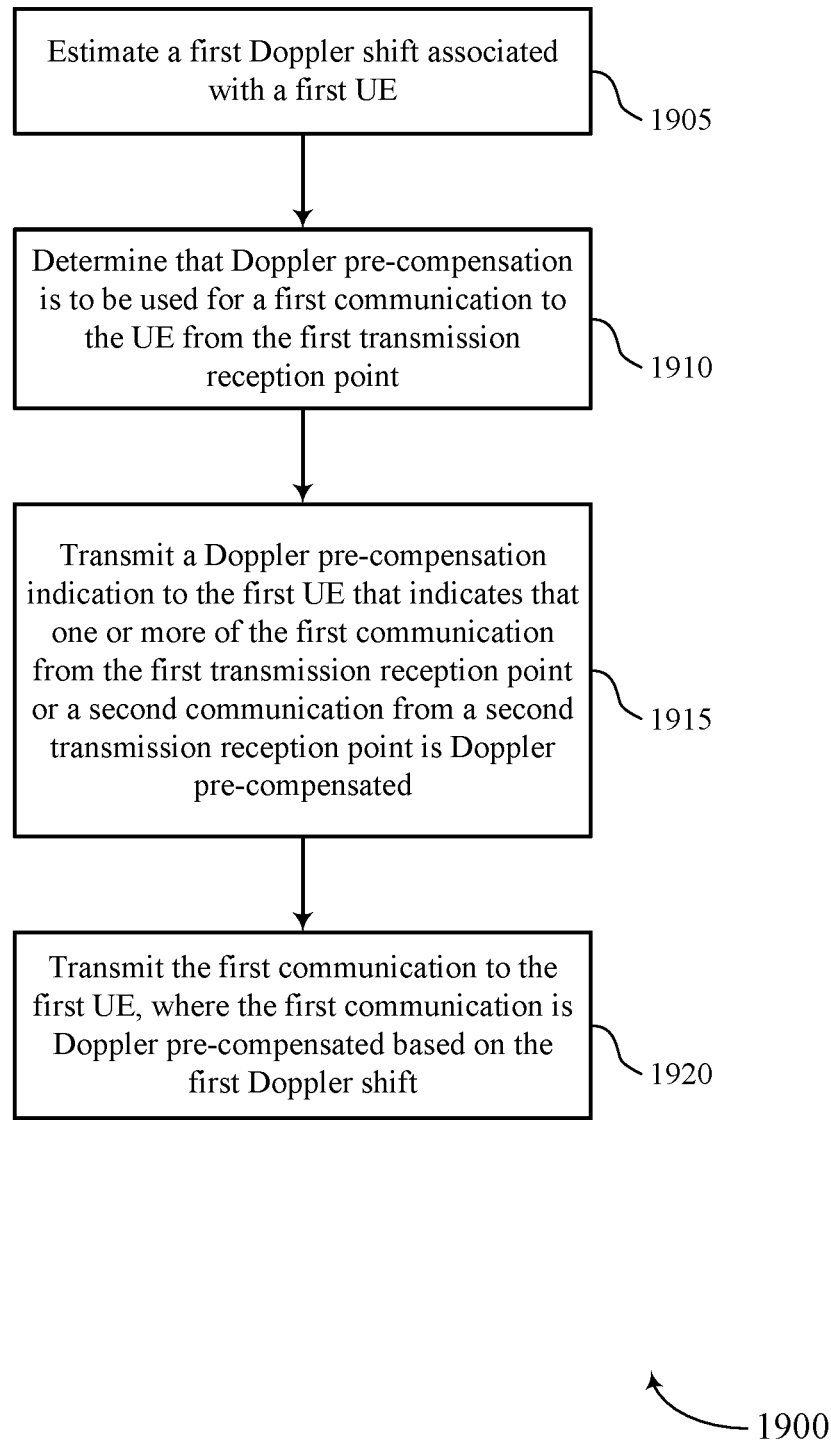

FIG. 19 shows a flowchart illustrating a method 1900 that supports indication of doppler pre-compensation in multi-TRP communications in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may estimate a first Doppler shift associated with a first UE. The operations of 1905 may be performed according to the methods described herein. In some examples, aspects of the operations of 1905 may be performed by a Doppler shift estimator as described with reference to FIGS. 10 through 13.

At 1910, the base station may determine that Doppler pre-compensation is to be used for a first communication to the UE from the first TRP. The operations of 1910 may be performed according to the methods described herein. In some examples, aspects of the operations of 1910 may be performed by a Doppler shift indication manager as described with reference to FIGS. 10 through 13.

At 1915, the base station may transmit a Doppler pre-compensation indication to the first UE that indicates that one or more of the first communication from the first TRP or a second communication from a second TRP is Doppler pre-compensated. The operations of 1915 may be performed according to the methods described herein. In some examples, aspects of the operations of 1915 may be performed by a Doppler shift indication manager as described with reference to FIGS. 10 through 13.

At 1920, the base station may transmit the first communication to the first UE, where the first communication is Doppler pre-compensated based on the first Doppler shift. The operations of 1920 may be performed according to the methods described herein. In some examples, aspects of the operations of 1920 may be performed by a joint transmission manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    estimating a first Doppler shift associated with a first transmission reception point and a second Doppler shift associated with a second transmission reception point;
    receiving a Doppler pre-compensation indication that indicates that one or more of a first communication from the first transmission reception point or a second communication from the second transmission reception point is Doppler pre-compensated based at least in part on the first Doppler shift or the second Doppler shift;

selecting, based at least in part on the Doppler pre-compensation indication, a first transmission configuration indicator state for the first communication and a second transmission configuration indicator state for the second communication; and receiving the first communication based at least in part on the first transmission configuration indicator state and the second communication based at least in part on the second transmission configuration indicator state.

2. The method of claim 1, wherein the receiving the Doppler pre-compensation indication comprises:

receiving downlink control information from one or more of the first transmission reception point or the second transmission reception point that includes at least one bit that provides the Doppler pre-compensation indication.

3. The method of claim 2, wherein the downlink control information includes a single bit that indicates both the first communication and the second communication are Doppler pre-compensated.

4. The method of claim 2, wherein the downlink control information includes two or more bits that indicate that the first communication is Doppler pre-compensated, the second communication is Doppler pre-compensated, or that both the first communication and the second communication are Doppler pre-compensated.

5. The method of claim 1, wherein the receiving the Doppler pre-compensation indication comprises:

receiving an indication of a change in transmission configuration indicator state from one or more of the first transmission reception point or the second transmission reception point.

6. The method of claim 5, further comprising:

determining whether the indication of the change in transmission configuration indicator state is associated with a quasi-co-location (QCL) type that has a low Doppler spread that indicates Doppler pre-compensation.

7. The method of claim 5, wherein a subset of transmission configuration indicator states are configured by radio resource control signaling to be associated with Doppler pre-compensation, and wherein the Doppler pre-compensation indication is determined based at least in part on whether the first transmission configuration indicator state or the second transmission configuration indicator state are within the subset of transmission configuration indicator states.

8. The method of claim 5, wherein the Doppler pre-compensation indication is provided separately for each of the first transmission reception point and the second transmission reception point based at least in part on one or more active transmission configuration indicator states.

9. The method of claim 1, wherein the receiving the Doppler pre-compensation indication comprises:

receiving a medium access control (MAC) control element from one or more of the first transmission reception point or the second transmission reception point that includes at least one bit that provides the Doppler pre-compensation indication.

10. The method of claim 9, wherein the MAC control element provides a separate Doppler pre-compensation indication for each of the first transmission reception point and the second transmission reception point, for each of one or more downlink channels, for each of one or more downlink reference signals, or any combinations thereof.

11. The method of claim 9, wherein the MAC control element includes an activation indication for one or more of the first transmission configuration indicator state or the second transmission configuration indicator state, and an indication of Doppler pre-compensation for each transmission configuration indicator state.

12. The method of claim 1, wherein the receiving the Doppler pre-compensation indication comprises:

receiving a control channel communication that is associated with a control resource set or a search space, wherein the control channel communication schedules the first communication and the second communication; and determining whether one or more of the first communication or the second communication are Doppler pre-compensated based at least in part on whether the control resource set or the search space is configured with a Doppler pre-compensation parameter.

13. The method of claim 12, wherein the control resource set or the search space is configured with the Doppler pre-compensation parameter via radio resource control signaling.

14. The method of claim 1, further comprising:

receiving an indication that the first communication and the second communication are transmitted based on a single frequency network (SFN) configuration or based on a non-SFN configuration.

15. The method of claim 14, wherein the SFN configuration uses Doppler pre-compensation and the non-SFN configuration does not use Doppler pre-compensation.

16. The method of claim 14, wherein the receiving the Doppler pre-compensation indication comprises:

receiving a medium access control (MAC) control element that includes one or more bits that indicate whether one or both of the SFN configuration or the non-SFN configuration use Doppler pre-compensation.

17. The method of claim 1, wherein the first transmission reception point is a first remote radio head and the second transmission reception point is a second remote radio head.

18. A method for wireless communication at a first transmission reception point, comprising:

estimating a first Doppler shift associated with a first user equipment (UE);

determining that Doppler pre-compensation is to be used for a first communication to the UE from the first transmission reception point;

transmitting a Doppler pre-compensation indication to the first UE that indicates that one or more of the first communication from the first transmission reception point or a second communication from a second transmission reception point is Doppler pre-compensated; and transmitting the first communication to the first UE, wherein the first communication is Doppler pre-compensated based at least in part on the first Doppler shift.

19. The method of claim 18, wherein the transmitting the Doppler pre-compensation indication comprises:

transmitting downlink control information to the first UE includes at least one bit that provides the Doppler pre-compensation indication.

20. The method of claim 19, wherein the downlink control information includes a single bit that indicates both the first communication and the second communication are Doppler pre-compensated.

21. The method of claim 19, wherein the downlink control information includes two or more bits that indicate that the first communication is Doppler pre-compensated, the second communication is Doppler pre-compensated, or that both the first communication and the second communication are Doppler pre-compensated.

22. The method of claim 18, wherein the transmitting the Doppler pre-compensation indication comprises:
transmitting an indication of a change in transmission configuration indicator state from one or more of the first transmission reception point or the second transmission reception point.

23. The method of claim 22, wherein the indication of the change in transmission configuration indicator state is associated with a quasi-co-location (QCL) type that has a low Doppler spread that indicates Doppler pre-compensation.

24. The method of claim 22, wherein a subset of transmission configuration indicator states are configured by radio resource control signaling to be associated with Doppler pre-compensation, and wherein the Doppler pre-compensation indication is based at least in part on whether the transmission configuration indicator state associated with one or more of the first transmission reception point or the second transmission reception point is within the subset of transmission configuration indicator states.

25. The method of claim 22, wherein the Doppler pre-compensation indication is provided separately for each of the first transmission reception point and the second transmission reception point based at least in part on one or more active transmission configuration indicator states.

26. The method of claim 18, wherein the transmitting the Doppler pre-compensation indication comprises:
transmitting a medium access control (MAC) control element to the first UE that includes at least one bit that provides the Doppler pre-compensation indication.

27. The method of claim 26, wherein the MAC control element provides a separate Doppler pre-compensation indication for each of the first transmission reception point and the second transmission reception point, for each of one or more downlink channels, for each of one or more downlink reference signals, or any combinations thereof.

28. The method of claim 26, wherein the MAC control element includes an activation indication for a first transmission configuration indicator state associated with the first transmission reception point, and an indication of Doppler pre-compensation for the first transmission configuration indicator state.

29. The method of claim 18, wherein the transmitting the Doppler pre-compensation indication comprises:
transmitting a control channel communication to the first UE that is associated with a control resource set or a search space, wherein the control channel communication schedules the first communication and the second communication; and
wherein whether one or more of the first communication or the second communication are Doppler pre-compensated is determined based at least in part on whether the control resource set or the search space is configured with a Doppler pre-compensation parameter.

30. The method of claim 29, wherein the control resource set or the search space is configured with the Doppler pre-compensation parameter via radio resource control signaling.

31. The method of claim 18, further comprising:
transmitting an indication that the first communication and the second communication are transmitted based on a single frequency network (SFN) configuration or based on a non-SFN configuration.

32. The method of claim 31, wherein the SFN configuration uses Doppler pre-compensation and the non-SFN configuration does not use Doppler pre-compensation.

33. The method of claim 31, wherein the transmitting the Doppler pre-compensation indication comprises:
transmitting a medium access control (MAC) control element that includes one or more bits that indicate whether one or both of the SFN configuration or the non-SFN configuration use Doppler pre-compensation.

34. An apparatus for wireless communication at a user equipment (UE), comprising:
a processor,
memory coupled with the processor; and
instructions stored in the memory and executable by the processor to cause the apparatus to:
estimate a first Doppler shift associated with a first transmission reception point and a second Doppler shift associated with a second transmission reception point;
receive a Doppler pre-compensation indication that indicates that one or more of a first communication from the first transmission reception point or a second communication from the second transmission reception point is Doppler pre-compensated based at least in part on the first Doppler shift or the second Doppler shift;
select, based at least in part on the Doppler pre-compensation indication, a first transmission configuration indicator state for the first communication and a second transmission configuration indicator state for the second communication; and
receive the first communication based at least in part on the first transmission configuration indicator state and the second communication based at least in part on the second transmission configuration indicator state.

35. The apparatus of claim 34, wherein the instructions are further executable by the processor to cause the apparatus to:
receive downlink control information from one or more of the first transmission reception point or the second transmission reception point that includes at least one bit that provides the Doppler pre-compensation indication.

36. The apparatus of claim 35, wherein the downlink control information includes a single bit that indicates both the first communication and the second communication are Doppler pre-compensated.

37. The apparatus of claim 35, wherein the downlink control information includes two or more bits that indicate that the first communication is Doppler pre-compensated, the second communication is Doppler pre-compensated, or that both the first communication and the second communication are Doppler pre-compensated.

38. The apparatus of claim 34, wherein the instructions are further executable by the processor to cause the apparatus to:
receive an indication of a change in transmission configuration indicator state from one or more of the first transmission reception point or the second transmission reception point.

39. The apparatus of claim 38, wherein the instructions are further executable by the processor to cause the apparatus to:
determine whether the indication of the change in transmission configuration indicator state is associated with a quasi-co-location (QCL) type that has a low Doppler spread that indicates Doppler pre-compensation.

40. The apparatus of claim 38, wherein a subset of transmission configuration indicator states are configured by radio resource control signaling to be associated with Doppler pre-compensation, and wherein the Doppler pre-compensation indication is determined based at least in part on whether the first transmission configuration indicator state or the second transmission configuration indicator state are within the subset of transmission configuration indicator states.

41. The apparatus of claim 38, wherein the Doppler pre-compensation indication is provided separately for each of the first transmission reception point and the second transmission reception point based at least in part on one or more active transmission configuration indicator states.

42. The apparatus of claim 34, wherein the instructions are further executable by the processor to cause the apparatus to:
receive a medium access control (MAC) control element from one or more of the first transmission reception point or the second transmission reception point that includes at least one bit that provides the Doppler pre-compensation indication.

43. The apparatus of claim 42, wherein the MAC control element provides a separate Doppler pre-compensation indication for each of the first transmission reception point and the second transmission reception point, for each of one or more downlink channels, for each of one or more downlink reference signals, or any combinations thereof.

44. The apparatus of claim 42, wherein the MAC control element includes an activation indication for one or more of the first transmission configuration indicator state or the second transmission configuration indicator state, and an indication of Doppler pre-compensation for each transmission configuration indicator state.

45. The apparatus of claim 34, wherein the instructions are further executable by the processor to cause the apparatus to:
receive a control channel communication that is associated with a control resource set or a search space, wherein the control channel communication schedules the first communication and the second communication; and
determine whether one or more of the first communication or the second communication are Doppler pre-compensated based at least in part on whether the control resource set or the search space is configured with a Doppler pre-compensation parameter.

46. The apparatus of claim 45, wherein the control resource set or the search space is configured with the Doppler pre-compensation parameter via radio resource control signaling.

47. The apparatus of claim 34, wherein the instructions are further executable by the processor to cause the apparatus to:
receive an indication that the first communication and the second communication are transmitted based on a single frequency network (SFN) configuration or based on a non-SFN configuration.

48. The apparatus of claim 47, wherein the SFN configuration uses Doppler pre-compensation and the non-SFN configuration does not use Doppler pre-compensation.

49. The apparatus of claim 47, wherein the instructions are further executable by the processor to cause the apparatus to:
receive a medium access control (MAC) control element that includes one or more bits that indicate whether one or both of the SFN configuration or the non-SFN configuration use Doppler pre-compensation.

50. An apparatus for wireless communication at a first transmission reception point, comprising:
a processor,
memory coupled with the processor; and
instructions stored in the memory and executable by the processor to cause the apparatus to:
estimate a first Doppler shift associated with a first user equipment (UE);
determine that Doppler pre-compensation is to be used for a first communication to the UE from the first transmission reception point;
transmit a Doppler pre-compensation indication to the first UE that indicates that one or more of the first communication from the first transmission reception point or a second communication from a second transmission reception point is Doppler pre-compensated; and
transmit the first communication to the first UE, wherein the first communication is Doppler pre-compensated based at least in part on the first Doppler shift.

51. The apparatus of claim 50, wherein the instructions are further executable by the processor to cause the apparatus to:
transmit downlink control information to the first UE includes at least one bit that provides the Doppler pre-compensation indication.

52. The apparatus of claim 51, wherein the downlink control information includes a single bit that indicates both the first communication and the second communication are Doppler pre-compensated.

53. The apparatus of claim 51, wherein the downlink control information includes two or more bits that indicate that the first communication is Doppler pre-compensated, the second communication is Doppler pre-compensated, or that both the first communication and the second communication are Doppler pre-compensated.

54. The apparatus of claim 50, wherein the instructions are further executable by the processor to cause the apparatus to:
transmit an indication of a change in transmission configuration indicator state from one or more of the first transmission reception point or the second transmission reception point.

55. The apparatus of claim 54, wherein the indication of the change in transmission configuration indicator state is associated with a quasi-co-location (QCL) type that has a low Doppler spread that indicates Doppler pre-compensation.

56. The apparatus of claim 54, wherein a subset of transmission configuration indicator states are configured by radio resource control signaling to be associated with Doppler pre-compensation, and wherein the Doppler pre-compensation indication is based at least in part on whether the transmission configuration indicator state associated with one or more of the first transmission reception point or the second transmission reception point is within the subset of transmission configuration indicator states.

57. The apparatus of claim 54, wherein the Doppler pre-compensation indication is provided separately for each of the first transmission reception point and the second transmission reception point based at least in part on one or more active transmission configuration indicator states.

58. The apparatus of claim 50, wherein the instructions are further executable by the processor to cause the apparatus to:
transmit a medium access control (MAC) control element to the first UE that includes at least one bit that provides the Doppler pre-compensation indication.

59. The apparatus of claim 58, wherein the MAC control element provides a separate Doppler pre-compensation indication for each of the first transmission reception point and the second transmission reception point, for each of one or more downlink channels, for each of one or more downlink reference signals, or any combinations thereof.

60. The apparatus of claim 58, wherein the MAC control element includes an activation indication for a first transmission configuration indicator state associated with the first transmission reception point, and an indication of Doppler pre-compensation for the first transmission configuration indicator state.

61. The apparatus of claim 50, wherein the instructions are further executable by the processor to cause the apparatus to:
transmit a control channel communication to the first UE that is associated with a control resource set or a search space, wherein the control channel communication schedules the first communication and the second communication; and
wherein whether one or more of the first communication or the second communication are Doppler pre-compensated is determined based at least in part on whether the control resource set or the search space is configured with a Doppler pre-compensation parameter.

62. The apparatus of claim 61, wherein the control resource set or the search space is configured with the Doppler pre-compensation parameter via radio resource control signaling.

63. The apparatus of claim 50, wherein the instructions are further executable by the processor to cause the apparatus to:
transmit an indication that the first communication and the second communication are transmitted based on a single frequency network (SFN) configuration or based on a non-SFN configuration.

64. The apparatus of claim 63, wherein the SFN configuration uses Doppler pre-compensation and the non-SFN configuration does not use Doppler pre-compensation.

65. The apparatus of claim 63, wherein the instructions are further executable by the processor to cause the apparatus to:
transmit a medium access control (MAC) control element that includes one or more bits that indicate whether one or both of the SFN configuration or the non-SFN configuration use Doppler pre-compensation.

66. An apparatus for wireless communication at a user equipment (UE), comprising:
means for estimating a first Doppler shift associated with a first transmission reception point and a second Doppler shift associated with a second transmission reception point;
means for receiving a Doppler pre-compensation indication that indicates that one or more of a first communication from the first transmission reception point or a second communication from the second transmission reception point is Doppler pre-compensated based at least in part on the first Doppler shift or the second Doppler shift;
means for selecting, based at least in part on the Doppler pre-compensation indication, a first transmission configuration indicator state for the first communication and a second transmission configuration indicator state for the second communication; and
means for receiving the first communication based at least in part on the first transmission configuration indicator state and the second communication based at least in part on the second transmission configuration indicator state.

67. An apparatus for wireless communication at a first transmission reception point, comprising:
means for estimating a first Doppler shift associated with a first user equipment (UE);
means for determining that Doppler pre-compensation is to be used for a first communication to the UE from the first transmission reception point;
means for transmitting a Doppler pre-compensation indication to the first UE that indicates that one or more of the first communication from the first transmission reception point or a second communication from a second transmission reception point is Doppler pre-compensated; and
means for transmitting the first communication to the first UE, wherein the first communication is Doppler pre-compensated based at least in part on the first Doppler shift.

68. A non-transitory computer-readable medium storing code for wireless communication at a user equipment (UE), the code comprising instructions executable by a processor to:
estimate a first Doppler shift associated with a first transmission reception point and a second Doppler shift associated with a second transmission reception point;
receive a Doppler pre-compensation indication that indicates that one or more of a first communication from the first transmission reception point or a second communication from the second transmission reception point is Doppler pre-compensated based at least in part on the first Doppler shift or the second Doppler shift;
select, based at least in part on the Doppler pre-compensation indication, a first transmission configuration indicator state for the first communication and a second transmission configuration indicator state for the second communication; and
receive the first communication based at least in part on the first transmission configuration indicator state and the second communication based at least in part on the second transmission configuration indicator state.

69. A non-transitory computer-readable medium storing code for wireless communication at a first transmission reception point, the code comprising instructions executable by a processor to:
estimate a first Doppler shift associated with a first user equipment (UE);
determine that Doppler pre-compensation is to be used for a first communication to the UE from the first transmission reception point;
transmit a Doppler pre-compensation indication to the first UE that indicates that one or more of the first communication from the first transmission reception point or a second communication from a second transmission reception point is Doppler pre-compensated; and
transmit the first communication to the first UE, wherein the first communication is Doppler pre-compensated based at least in part on the first Doppler shift.

* * * * *